United States Patent
Diemer Lopes

(10) Patent No.: US 11,149,985 B2
(45) Date of Patent: Oct. 19, 2021

(54) SYSTEM AND METHOD FOR HEATING WATER

(71) Applicant: Mitsubishi Electric US, Inc., Cypress, CA (US)

(72) Inventor: Luiz Antonio Diemer Lopes, Duluth, GA (US)

(73) Assignee: Mitsubishi Electric US, Inc., Cypress, CA (US)

(*) Notice: Subject to any disclaimer, the term of this patent is extended or adjusted under 35 U.S.C. 154(b) by 161 days.

(21) Appl. No.: 16/427,873

(22) Filed: May 31, 2019

(65) Prior Publication Data

US 2020/0378651 A1 Dec. 3, 2020

(51) Int. Cl.
| | |
|---|---|
| *F24H 9/20* | (2006.01) |
| *F24H 4/04* | (2006.01) |
| *F24H 1/20* | (2006.01) |
| *F24H 9/12* | (2006.01) |

(52) U.S. Cl.
CPC ............ *F24H 9/2007* (2013.01); *F24H 1/202* (2013.01); *F24H 4/04* (2013.01); *F24H 9/12* (2013.01); *F24D 2200/32* (2013.01)

(58) Field of Classification Search
CPC .......... F24H 9/2007; F24H 4/04; F24H 1/202; F24H 9/12; F24D 2200/32
See application file for complete search history.

(56) References Cited

U.S. PATENT DOCUMENTS

| | | | |
|---|---|---|---|
| 4,299,098 A | * | 11/1981 | Derosier ............ F24D 11/0214 62/238.6 |
| 6,668,572 B1 | | 12/2003 | Seo et al. |
| 8,250,874 B2 | | 8/2012 | Ikegami et al. |

(Continued)

FOREIGN PATENT DOCUMENTS

| | | |
|---|---|---|
| EP | 2306111 A1 | 4/2011 |
| JP | 2011061398 A * | 3/2011 |
| JP | 2016191493 A * | 11/2016 |

OTHER PUBLICATIONS

Miki et al., Storage Water Heater, Nov. 10, 2016, JP2016191493A, Whole Document (Year: 2016).*

(Continued)

*Primary Examiner* — Larry L Furdge
(74) *Attorney, Agent, or Firm* — Posz Law Group, PLC

(57) ABSTRACT

A water-heating system, including: a controller; a refrigerant-water heat exchanger for exchanging heat between refrigerant and water; a sensor circuit for measuring a current water temperature of water in a water heater and providing the current water temperature to the controller; a first refrigerant pipe for passing the refrigerant from a refrigerant source to the refrigerant-water heat exchanger; a second refrigerant pipe for passing the refrigerant from the refrigerant-water heat exchanger to the refrigerant source; a first water pipe for passing the water from the water heater to the refrigerant-water heat exchanger; a second water pipe for passing the water from the refrigerant-water heat exchanger to the water heater; and a water pump for pumping water from the water heater to the refrigerant-water heat exchanger via the first water pipe and from the refrigerant-water heat exchanger to the water heater via the second water pipe based on a control signal.

21 Claims, 8 Drawing Sheets

(56) References Cited

U.S. PATENT DOCUMENTS

| | | |
|---|---|---|
| 10,006,670 B2 | 6/2018 | Leman et al. |
| 2015/0047973 A1* | 2/2015 | Yoshida .............. C02F 1/46104 |
| | | 204/239 |
| 2015/0300699 A1* | 10/2015 | Styles ....................... F24H 4/04 |
| | | 62/498 |
| 2016/0138829 A1* | 5/2016 | Park ................... F24D 19/1066 |
| | | 122/14.1 |

OTHER PUBLICATIONS

Fukunaga et al., Heat Pump Type Water Heater, Mar. 31, 2011, JP2011064398A, Whole Document (Year: 2011).*

* cited by examiner

SYSTEM AND METHOD FOR HEATING WATER

FIELD OF THE INVENTION

The present invention relates generally to hot-water-heating systems that are used proximate to other systems that create waste heat (e.g., air-conditioning systems). More particularly, the present invention relates to a hot water heater that can heat water using waste heat from a nearby heat-generating system instead of a heating element in the hot water heater.

BACKGROUND OF THE INVENTION

A conventional water heater includes a water reservoir and a heating element that heats the water in the water reservoir for use in a residential or commercial property. The heating element can be an electric heater, a gas heater, an oil heater, or any suitable kind of heating element. Regardless of its type, using the heating element to heat the water in the water reservoir consumes resources, whether those resources are electric power, natural gas, oil, coal, etc.

A water heater will typically maintain the water in its water reservoir at a set minimum temperature. To accomplish this, the heating element heats the water whenever it falls below the minimum temperature. This requires periodic operation of the heating element, which consumes the resources (electric power, natural gas, oil, coal, etc.) in proportion to the amount of time that the electric heater operates.

In addition to water heaters, many buildings include systems that generate waste heat. For example, many conventional air-conditioning systems use a heat pump to provide heating during colder temperatures and cooling during warmer temperatures. The heat pump is typically located in an outdoor unit in the air-conditioning system and either heats a refrigerant to warm the air inside a building (in a heating operation) or chills the refrigerant to cool the air inside the building (in a cooling operation).

During the heating operation, the heat pump must continually absorb heat from a heat source (e.g., outside air proximate to the heat pump) to warm the refrigerant so that it can be used to warm the air inside the building. However, during a cooling operation, the heat pump must dissipate heat from the refrigerant (e.g., to outside air proximate to the heat pump) to chill it so that the refrigerant can be used to cool the air inside the building. Generally, this waste heat generated during a cooling operation is put to no useful purpose.

Although air-conditioning systems are one of the most common sources of waste heat in most buildings, there are numerous other sources of waste heat. For example, waste heat is generated by power plants used to produce electric power (e.g., using coal, oil, natural gas, nuclear, etc.), certain industrial processes such as oil refining, steel making, or glass making, the operation of electronic components such as computers, and other systems. In most cases, this waste heat is dissipated to outside air or a passing water supply to no useful purpose.

It would therefore be desirable to provide a mechanism that will use the waste heat generated by a system associated with a building to a heat the water in a water heater located in that building. This could reduce the consumption of heating resources (electric power, natural gas, oil, coal, etc.) for the water heater and thereby reduce the cost of its operation.

SUMMARY OF THE INVENTION

A water-heating system is provided, comprising: a controller; a refrigerant-water heat exchanger configured to exchange heat between refrigerant and water; a sensor circuit configured to measure a current water temperature of water in a water heater and provide the current water temperature to the controller; a first refrigerant pipe configured to pass the refrigerant from a refrigerant source to the refrigerant-water heat exchanger; a second refrigerant pipe configured to pass the refrigerant from the refrigerant-water heat exchanger to the refrigerant source; a first water pipe configured to pass the water from the water heater to the refrigerant-water heat exchanger; a second water pipe configured to pass the water from the refrigerant-water heat exchanger to the water heater; a water pump configured to pump water from the water heater to the refrigerant-water heat exchanger via the first water pipe and from the refrigerant-water heat exchanger to the water heater via the second water pipe based on a pump control signal from the controller, wherein the first water pipe is connected to a tank drain valve on the water heater, the second water pipe is connected to a pressure relief valve on the water heater, and the controller is configured to identify a lower temperature set point for the water in the water heater at which one or more heating elements in the water heater are set to heat the water, determine when the current water temperature is below a threshold temperature but above the lower temperature set point, instruct the water pump to pump water to the refrigerant-water heat exchanger when the current water temperature is below the threshold temperature but above the lower temperature set point, and instruct the refrigerant source to provide refrigerant to the refrigerant-water heat exchanger when the current water temperature is below the threshold temperature but above the lower temperature set point, and the threshold temperature is a set temperature differential greater than the lower temperature set point The sensor circuit may be attached to the water heater.

The sensor circuit may be further configured to measure an electric current value of an electric current provided to the water heater and provide the electric current value to the controller, and the controller may be further configured to identify the lower temperature set point to be a first water temperature in the water heater when the electric current value first exceeds a current threshold, identify an upper temperature set point to be a second water temperature in the water heater when the electric current value stops exceeding the current threshold, instruct the water pump to stop pumping water to the refrigerant-water heat exchanger when the water in the water heater rises above the upper temperature set point, and instruct the refrigerant source to stop providing refrigerant to the refrigerant-water heat exchanger when the water in the water heater rises above the upper temperature set point.

One or more heating elements in the water heater may be activated when the electric current value exceeds a current threshold and are deactivated when the electric current is below the current threshold.

The refrigerant source may be an air-conditioner. The controller may be a microprocessor.

A method of heating water contained in a water heater is provided, the method including: determining a lower temperature set point that represents a temperature of water in the water heater below which one or more heating elements in the water heater activate to heat the water in the water heater; measuring a pre-heat-exchange water temperature in the water heater after determining the lower temperature set point; determining that the pre-heat-exchange water temperature is below a threshold water temperature but above the lower temperature set point; sending heated refrigerant from a refrigerant source to a refrigerant-water heat exchanger after determining that the pre-heat-exchange temperature is below the threshold water temperature but above the lower temperature set point; sending water from the water heater to the refrigerant-water heat exchanger after it is determined that the pre-heat-exchange temperature is below the threshold water temperature but above the lower temperature set point; and exchanging heat between the refrigerant and the water from the water heater after sending heated refrigerant from the refrigerant source to the refrigerant-water heat exchanger and sending water from the water heater to the refrigerant-water heat exchanger, wherein the threshold water temperature is a set temperature differential greater than the lower temperature set point.

The set temperature differential may vary based on a rate of change in water in the water heater.

The method may further comprise: repeatedly measuring the pre-heat-exchange water temperature and determining that the pre-heat-exchange water temperature is above the threshold water temperature prior to determining that the pre-heat-exchange water temperature is below the threshold water temperature but above the lower temperature set point.

The operation of determining the lower temperature set point may include: determining whether a heating element in the water heater has been activated; measuring an activation water temperature in the water heater substantially concurrently with determining that the heating element in the water heater has been activated; and setting the lower temperature set point to be equal to the activation water temperature after it is determined that the heating element in the water heater has been activated.

The operation of determining the lower temperature set point ay include: measuring an electric current provided to the water heater; measuring a calibration water temperature in the water heater substantially concurrently with measuring the electric current; determining that the measured electric current is above a current threshold; and setting the lower temperature set point to be equal to the calibration water temperature after it is determined that the measured electric current is above the current threshold.

The method may further comprise: repeatedly measuring the electric current, measuring the recalibration water temperature, and determining that the measured electric current is below the current threshold prior to determining that the measured electric current is above the current threshold.

The method may further comprise: determining an upper temperature set point that represents a temperature of the water in the water heater above which the one or more heating elements are deactivated; measuring a post-heat-exchange water temperature in the water heater after exchanging heat between the refrigerant and the water from the water heater; determining that the post-heat-exchange water temperature is above the upper temperature set point after remeasuring the post-heat-exchange water temperature; stopping sending heated refrigerant from the refrigerant source to the refrigerant-water heat exchanger after it is determined that the post-heat-exchange temperature is above the upper temperature set point; and stopping sending water from the water heater to the refrigerant-water heat exchanger after it is determined that the post-heat-exchange temperature is above the upper temperature set point.

The method may further comprise: repeatedly measuring the post-heat-exchange water temperature, and determining that the post-heat-exchange water temperature is below the upper temperature set point prior to determining that the post-heat-exchange water temperature is above the threshold water temperature.

The operation of determining the upper temperature set point may include: exchanging heat between the refrigerant and the water from the water heater in the refrigerant-water heat exchanger; measuring an electric current provided to the water heater after exchanging heat between the refrigerant and the water from the water heater in the refrigerant-water heat exchanger; measuring a calibration water temperature in the water heater substantially concurrently with measuring the electric current; determining that the measured electric current is below a current threshold; and setting the upper temperature set point to be equal to the calibration water temperature after it is determined that the measured electric current is below the current threshold.

The method may further comprise: repeatedly measuring the electric current, measuring the calibration water temperature, and determining that the measured electric current is above the current threshold prior to determining that the measured electric current is below the current threshold.

The method may further comprise: determining that heating is available for water in a water heater from the refrigerant source prior to measuring the pre-heat-exchange water temperature.

The refrigerant source may be an air-conditioner, and the operation of determining that heating is available from the refrigerant source may include identifying an operating mode of the air conditioner, and determining that heating is available from the refrigerant source when the air-conditioner is in a cooling mode.

The method may further comprise: comparing a current timer value to a threshold timer value prior to measuring the current water temperature; determining that the current timer value is greater than or equal to the threshold timer value based on the comparing of the current timer value to the threshold timer value; and redetermining the lower temperature set point when the current timer value is greater than or equal to the threshold timer value prior to measuring the current water temperature.

The operation of redetermining the lower temperature set point may include: measuring a recalibration electric current provided to the water heater; measuring the recalibration water temperature in the water heater substantially concurrently with measuring the recalibration electric current; determining that the recalibration electric current is above the current threshold; and setting the lower temperature set point to be equal to the recalibration water temperature after it is determined that the recalibration electric current is above the current threshold.

The method may further comprise: repeatedly measuring the recalibration electric current, measuring the recalibration water temperature, and determining that the measured electric current is below the current threshold prior to determining that the measured electric current is above the current threshold.

A method of heating water contained in a water heater is provided, the method including: determining that a refrigerant source contains excess heat that can be transferred to water in a water heater; determining a first temperature of the water in the water heater; comparing the first temperature of the water in the water heater to a maximum water temperature for the water heater; determining that the first temperature of the water in the water heater is below the maximum water temperature; sending heated refrigerant from a refrigerant source to a refrigerant-water heat exchanger after determining that the first temperature is below the maximum water temperature; sending water from the water heater to the refrigerant-water heat exchanger after determining that the first temperature is below the maximum water temperature; and exchanging heat between the refrigerant and the water from the water heater after sending heated refrigerant from the refrigerant source to the refrigerant-water heat exchanger and sending water from the water heater to the refrigerant-water heat exchanger.

The refrigerant source may be an air-conditioner, and the operation of determining that the refrigerant source contains excess heat may include identifying an operating mode of the air conditioner, and determining that the air-conditioner is in a cooling mode.

The method may further comprise: determining a second temperature of the water in the water heater after exchanging heat between the refrigerant and the water; comparing the second temperature of the water in the water heater to the maximum water temperature for the water heater; determining that the second temperature of the water in the water heater is above the maximum water temperature; stopping sending heated refrigerant from the refrigerant source to the refrigerant-water heat exchanger after determining that the second temperature is above the maximum water temperature; and stopping sending water from the water heater to the refrigerant-water heat exchanger after determining that the second temperature is above the maximum water temperature.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present disclosure.

DETAILED DESCRIPTION

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Water-Heating System Using Waste Heat

Figure 1:
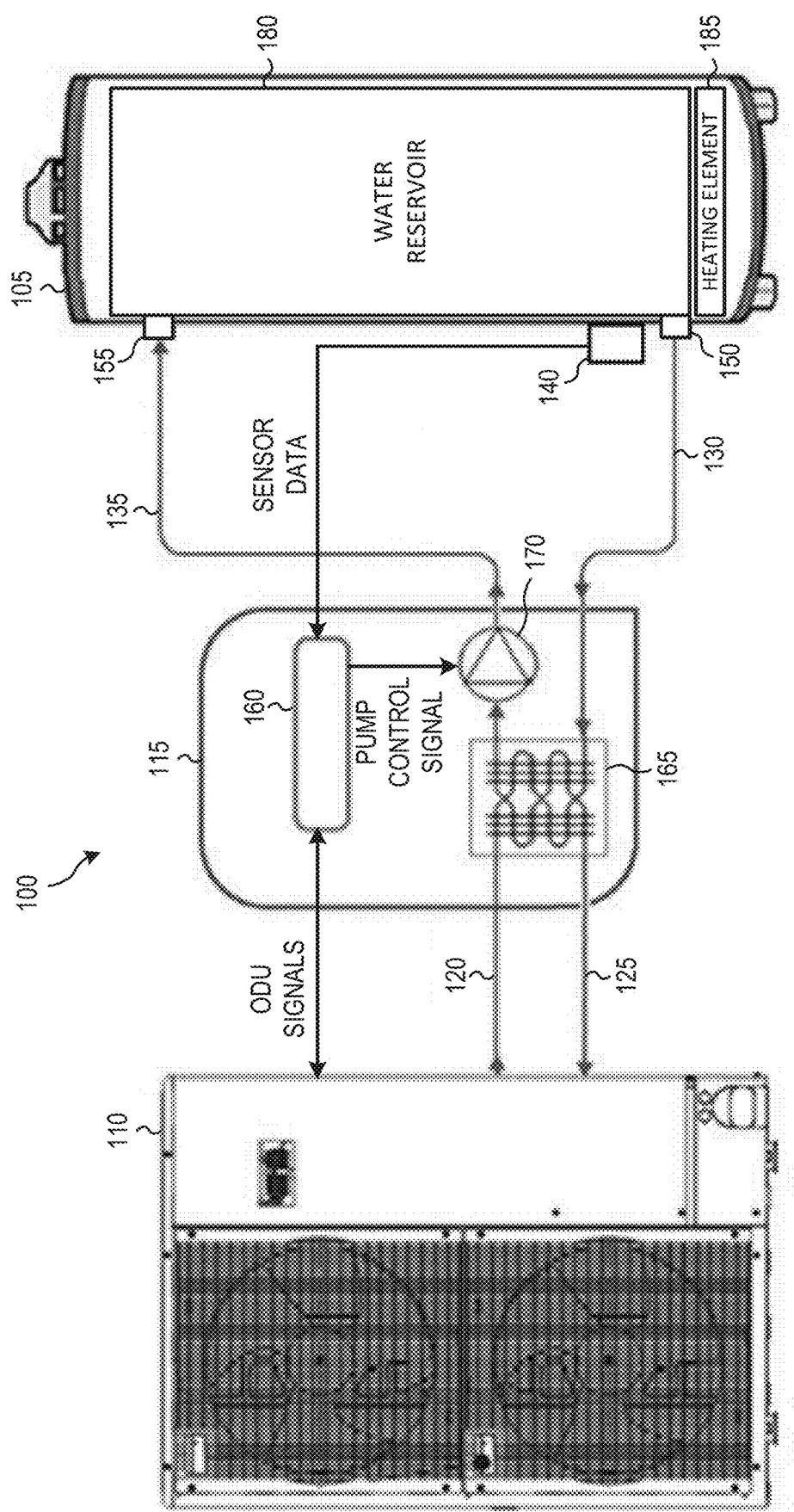
FIG. 1 is a block diagram of a water-heating system using waste heat according to disclosed embodiments.

FIG. 1 is a block diagram of a water-heating system 100 using waste heat according to disclosed embodiments.

As shown in FIG. 1, the water-heating system 100 includes a water heater 105, an outdoor unit (ODU) 110, a water-heating cabinet 115, a first refrigerant line 120, a second refrigerant line 125, a first water line 130, a second water line 135, and a sensor circuit 140. The water heater 105 includes a water reservoir 180, a heating element 185, a tank drain valve 150, and a pressure relief valve 155. The water-heating cabinet 115 includes a control board 160, a refrigerant-water heat exchanger 165, and a recirculating water pump 170.

The water heater 105 operates to heat water for use inside a building, e.g., in faucets, showers, washing machines, dishwashers, machinery, etc. The water heater 105 can also be referred to as a hot water tank or a boiler. When in domestic use, the water heater 105 will generally heat potable water suitable for individual use by the residents of the building. However, in some embodiments the water heater 105 may be an industrial water heater that heats non-potable water for industrial uses.

In the disclosed embodiments, the water heater 105 is a storage water heater that maintains a quantity of water in the water reservoir 180 at a relatively high temperature (i.e., above ambient temperature) available for immediate use. In operation, the water heater 105 continually ort periodically monitors the temperature of water in its water reservoir 180. When the temperature of the water in the water reservoir 180 drops below a threshold value, the water heater 105 activates its heating element 185 to heat the water such that the water temperature rises above the threshold temperature.

Once the water in the water reservoir 180 rises above the threshold temperature, water heater 105 will deactivate the heating element 185 until such a time as the water temperature in the water reservoir 180 again falls below the threshold temperature.

The water reservoir 180 is a part of the water heater 105 that contains water for heating. Typically, it makes up the bulk of the water heater 105. The water reservoir 180 will have an inlet pipe (not shown) that receives unheated water from a water supply (e.g., the building's water pipes), and an outlet pipe (not shown) that provides heated water to locations in the building (e.g., bathrooms, kitchens, etc.). In addition, the water reservoir 180 can be accessed by the tank drain valve 150 and the pressure relief valve 155.

The heating element 185 is a device that is configured to heat the water in the water reservoir 180. There are multiple possible implementations of the heating element 185 including: an electric heater, a natural gas heater, an oil heater, a coal heater, a kerosene heater, and a gasoline heater. However, this list is by way of example only. Any suitable device that heats water can be used as the heating element 185.

The water heater 105 can be a conventional water heater used to heat water for use in a building without consulting any components outside the water heater 105. However, the water heater 105 will also require connections that allow the water in its water reservoir 180 to flow out of the water reservoir 180 in the water heater 105 into the refrigerant-water heat exchanger 165 in the water-heating cabinet 115 and back from the refrigerant-water heat exchanger 165 into the water reservoir 180 in the water heater 105. These connections can be pre-existing connections for access to the water reservoir 180, e.g., the tank drain valve 150 or the pressure relief valve 155. Alternatively, they can be connections added to a conventional water heater 105 to provide the necessary access. If an existing tank drain valve 150 and pressure relief valve 155 are used, then there would be no need to modify an existing water heater 105 to connect to the water-heating cabinet 115. In this way, there would be no need for any significant increase in complexity, size, or cost of the water heater 105 as compared to a water heater 105 that operates independently of a water-heating cabinet 115.

Absent the operation of the water-heating cabinet 115, the water heater 105 is set to try and keep the water in its water reservoir 180 at a target water temperature. However, to keep the heating element from continually turning on, the water heater typically operates based on two temperature set points: a lower temperature set point (LSP) and an upper temperature set point (USP). The LSP represents the water temperature at or below which the water heater 105 will begin heating the water in its water reservoir 180. The USP represents the maximum water temperature to which the water heater 105 will heat the water in its water reservoir 180.

For example, consider a situation in which a water heater 105 has an LSP of 95° F. and a USP of 120° F. This would mean that the water heater 105 is programmed to try and keep the water temperature no hotter than 120° F. and no cooler than 95° F. When the water heater 105 determines that temperature of the water in the water heater 105 reaches 95° or lower, it will activate the heating element 185 to begin heating the water. Then, when it determines that the water temperature reaches 120° F. the water heater 105 will deactivate the heating element 185 until such a time as the water temperature again reaches 95° F. or lower. Thus, the water heater 105 doesn't actually maintain the water at its USP, but instead maintains it at a temperature between the LSP and the USP.

The outdoor unit 110 is an outdoor component of a conventional air-conditioning system. It can either include a heat pump or can operate as a heat pump, providing heating or cooling to an indoor space inside of a building using a refrigerant as a heat exchange mechanism. In a heating mode, the heat pump uses heat from an ambient source (e.g., outside air) to warm the refrigerant and thereby provide the heat required to heat the indoor space in a manner that would be understood by one skilled in the air-conditioning arts. In a cooling mode, the heat pump operates to exchange heat from the refrigerant to the ambient source (e.g., outside air) to cool the refrigerant and thereby provide the cooling required to cool the indoor space in a manner that would be understood by one skilled in the air-conditioning arts.

This outdoor unit 110 can be a conventional outdoor unit used in a conventional air-conditioning system. However, the outdoor unit 110 will require connections that allow the refrigerant in the outdoor unit 110 to flow out of the outdoor unit 110 into the refrigerant-water heat exchanger 165 and back from the refrigerant-water heat exchanger 165 into the outdoor unit 110. These connections can be pre-existing connections for access to the refrigerant, e.g., refrigerant drainage access valves, or can involve modifications to a outdoor unit 110 to provide such access. Typically, providing access to the refrigerant can be easily made without significant increases in complexity, size, or cost of the outdoor unit 110.

Although FIG. 1 discloses an outdoor air-conditioning unit 110 as a source of refrigerant to the refrigerant-water heat exchanger 165, this is by way of example only. Alternate embodiments could obtain refrigerant for the refrigerant-water heat exchanger 165 from any other sources that warms a refrigerant using waste heat. For example, one alternate embodiment could replace the outdoor unit 110 with a power plant used to produce electric power (e.g., using coal, oil, natural gas, nuclear, etc.) that heats a refrigerant using its waste heat. Another alternate embodiment could replace the outdoor unit 110 with industrial machinery (e.g., an oil refinery, a steel mill, a glass factory, etc.) that heats a refrigerant using its waste heat. Yet another alternate embodiment could replace the outdoor unit with a collection of electronic components (e.g., a computer room or a server farm) that heats a refrigerant using its waste heat. Any suitable source of waste heat can be used in other embodiments.

The water-heating cabinet 115 serves as an intermediary between the water heater 105 and the outdoor unit 110, allowing water from the water heater 105 to be heated by the refrigerant, which is heated by waste heat from the outdoor unit 110.

The first refrigerant line 120 and the second refrigerant line 125 serve to connect the outdoor unit 110 to the refrigerant-water heat exchanger 165 and provide a path for refrigerant to pass from the outdoor unit 110 to the refrigerant-water heat exchanger 165 and from the refrigerant-water heat exchanger 165 to the outdoor unit 110. As shown in the embodiment of FIG. 1, refrigerant passes from the outdoor unit 110 to the refrigerant-water heat exchanger 165 via the first refrigerant line 120, and refrigerant passes from the refrigerant-water heat exchanger 165 back to the outdoor unit 110 via the second refrigerant line 125.

The first water line 130 and the second water line 135 serve to connect the water heater 105 to the refrigerant-water heat exchanger 165 and to provide a path for water to pass from the water heater 105 to the refrigerant-water heat exchanger 165 and from the refrigerant-water heat exchanger 165 to the water heater 105. As shown in the embodiment of FIG. 1, water passes from the water heater 105 to the refrigerant-water heat exchanger 165 via the first water line 130, and water passes from the refrigerant-water heat exchanger 165 to the water heater via the second water line 135.

In the embodiment of FIG. 1, the first water line 130 is connected to the tank drain valve 150 and receives water from the water reservoir 180 in the water heater 105 via the tank drain valve 150. Likewise, the second water line 135 is connected to the pressure relief valve 155 and provides water to the water reservoir 180 in the water heater 105 via the pressure relief valve 155.

The sensor circuit 140 includes one or more sensors that can be used to monitor the operation of the water heater 105. Specifically, current If the heating element 185 is a different kind of heater, the heating element sensor would be configured accordingly such that it properly indicated when the heating element 185 was activated.

In some embodiments the sensor circuit 140 will be an integral part of the water heater 105. For example, the water heater could be designed to operate with a water-heating cabinet 115 from the start. In other embodiments the sensor circuit 140 will be a device separate from the water heater 105 that attaches to the water heater 105. For example, the sensor circuit 140 could be an add-on that allows a water-heating cabinet 115 to be connected to an existing water heater 105 without the need to significantly modify the water heater 105.

The tank drain valve 150 is a valve that allows water to be drained from the water reservoir 180 in the water heater 105. Typically, the tank drain valve 150 is provided at the bottom of the water heater 105 so that gravity will allow the water to drain from the water reservoir 180 in the water heater 105 without the need for a pump. For similar reasons the first water line 130 is connected to the tank drain valve 150 so that water can be more easily provided from the water heater 105 to the refrigerant-water heat exchanger 165. Although the recirculating water pump 170 will operate to move water from the water heater 105 through the refrigerant-water heat exchanger 165, and back to the water heater 105, gravity and water pressure at the bottom of the water heater 105 will mean that the recirculating water pump 170 will not have to work as hard to pump the water. Furthermore, the connection of the first water line 130 to the tank drain valve 150 means that if the water heater 105 is not full of water, the first water line 130 will still be able to draw water from the water reservoir 180.

In some embodiments the first water line 130 may be connected to the tank drain valve 150 using a three-way connector in which one of the openings performs the function of a conventional tank drain valve 150. In this way, the tank drain valve 150 can still be used to drain water from the water reservoir 180 in the water heater 105 when desired.

The pressure relief valve 155 is a valve in the water heater 105 that allows water or steam to escape from the water reservoir 180 of the water heater 105 to prevent an undesirable pressure buildup in the water reservoir 180 of the water heater 105. It is generally designed to open temporarily and discharge short spurts of water or steam when the temperature of the water in the water heater 105 exceeds a maximum allowable temperature (e.g., 200-220° F.) or when the pressure in the water reservoir 180 of the water heater 105 exceeds a maximum allowable pressure (e.g., 140-160 psi).

Typically, a pressure relief valve 155 in a water heater 105 is provided near the top of the water reservoir 180 in the water heater 105 so that water or steam can be released to reduce the pressure in the water reservoir 180 without causing additional water in the water reservoir 180 to drain out. The second water line 135 is connected to the pressure relief valve so that water can be returned to the water reservoir 180 from the refrigerant-water heat exchanger 165 more easily.

In some embodiments the second water line 135 may be connected to the pressure relief valve 155 using a three-way connector in which one of the openings performs the function of a conventional pressure relief valve 155. In this way, the pressure relief valve 155 can still be used to release water/steam from the water reservoir 180 in the water heater 105 when necessary.

By connecting the first and second water lines 130, 135 to the tank drain valve 150 and the pressure relief valve 155, respectively, the water-heating cabinet 115 can be connected to an existing water heater 105 without the need for significant modification of the water heater 105. However, alternate embodiments could provide one or two additional valves on the water heater 105 that are dedicated to connecting the first and/or second water lines 130, 135 to the water heater 105.

The control board 160 includes a controller that serves to control the operation of the components of the water-heating cabinet 115 based, in part, on sensor data received from the sensor circuit 140, operational signals received from the outdoor unit 110, and its own operating parameters. For example, the control board 160 may receive sensor data from the sensor circuit 140 and operational signals from the outdoor unit 110 and use that sensor data and operational signals to determine when to control the recirculating water pump 170 to pump water from the water heater 105 to the refrigerant-water heat exchanger 165. In some embodiments the control board 160 may also provide information to the outdoor unit 110.

In some embodiments the control board 160 can include a microprocessor, an application-specific integrated circuit (ASIC), or another suitable circuit for controlling operation of the components of the water-heating cabinet 115.

The refrigerant-water heat exchanger 165 receives refrigerant from the outdoor unit 110 (via the first refrigerant line 120) and water from the water heater 105 (via the first water line 130) and facilitates the transfer of heat from the refrigerant to the water. It then provides the cooled refrigerant back to the outdoor unit 110 (via the second refrigerant line 125) and provides the heated water back to the water heater 105 (via the second water line 135).

In the disclosed embodiment of FIG. 1, the refrigerant-water heat exchanger 165 includes a refrigerant pathway and a water pathway. The refrigerant pathway may be a pipe coil that is connected to the first and second refrigerant lines 120, 125 and allows the refrigerant to flow through it. Likewise, the water pathway may be a pipe coil that is connected to the first and second water lines 130, 135 and allows the water to flow through it. The water pathway may also be called a hydronic coil. The refrigerant pathway and the water pathway are typically formed proximate to each other such that heat can easily transfer from the refrigerant in the refrigerant pathway to the water in the water pathway.

Alternate embodiments can employ any suitable structure for the refrigerant pathway and the water pathway that facilitates the passage of refrigerant and hot water and the transfer of heat from the refrigerant to the water. For example, the refrigerant pathway and water pathway could be formed to be parallel to each other, intertwined with each other, etc.

The water-heating cabinet 115 can be located proximate to the water heater 105, proximate to the outdoor unit 110, or at any suitable location between the water heater 105 and the outdoor unit 110 as desired.

In the disclosed embodiments the water-heating cabinet 115 is formed outside of both the water heater 105 and the outdoor unit 110 so that the water-heating cabinet 115 can be used with a conventional water heater 105 and a conventional outdoor unit 110 without having to make significant modifications to either unit. However, alternate embodiments can include the water-heating cabinet 115 as an integral part of either the water heater 105 or the outdoor unit 110.

The recirculating water pump 170 operates to pump water from the water heater 105 through the first water line 130 to the hot water pathway in the refrigerant-water heat exchanger 165 and then through the second water line 135 back to the water heater 105 when heat is to be exchanged between the refrigerant and the water. In the disclosed embodiment the recirculating water pump 170 is located on the second water line 135 between the refrigerant-water heat exchanger 165 and the pressure relief valve 155. However, this is by way of example only. In alternate embodiments the recirculating water pump 170 may be located anywhere between the water heater 105 and the refrigerant-water heat exchanger 165 where it can pump the water from the water heater 105 to the refrigerant-water heat exchanger 165.

In various embodiments the recirculating water pump 170 could be a centrifugal water pump or a positive displacement water pump, depending upon the requirements of water pumping for the system.

Although not shown, the water heating system 100 will also have a pump of some kind (not shown) to move the refrigerant from the outdoor unit 110 through the first refrigerant line 120, the refrigerant pathway in the refrigerant-water heat exchanger 165 and the second refrigerant line 125. This pump may be in the outdoor unit 110, between the outdoor unit 110 and the water-heating cabinet 115, or in the water-heating cabinet 115.

By running the recirculating water pump 170, water is taken from the water heater 105, passes through the first water line 130 to the hot water pathway in the refrigerant-water heat exchanger 165, absorbs heat from a refrigerant supplied by the outdoor unit 110, then passes through the second water line 135 back to the water heater 105. The system 100 can therefore circulate water from the water heater 105 to the refrigerant-water heat exchanger 165, thereby heating the water by heat transfer with the hot refrigerant without the need to operate the heating element 185 in the water heater 105.

Sensor Circuit

Figure 2:
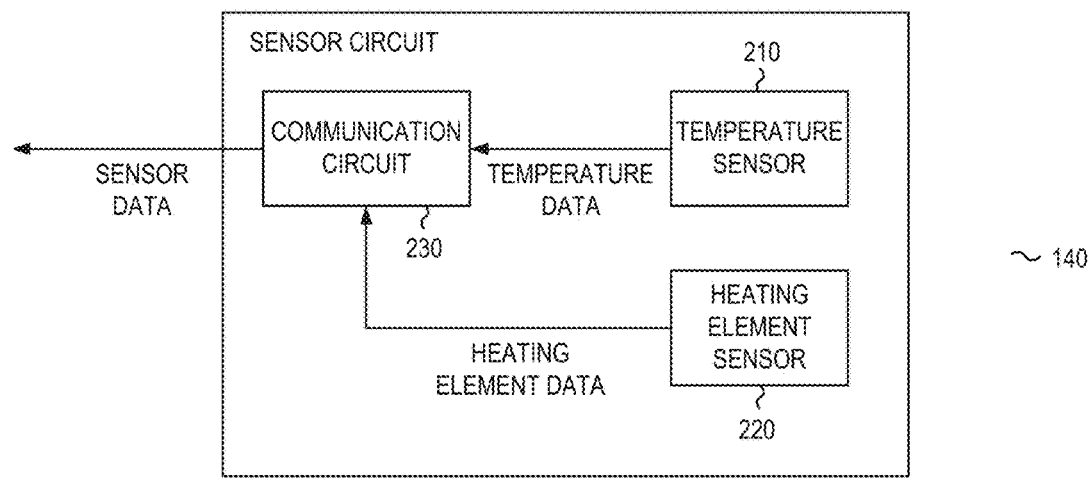
FIG. 2 is a block diagram of the sensor circuit of FIG. 1 according to disclosed embodiments.

FIG. 2 is a block diagram of the sensor circuit 140 of FIG. 1 according to disclosed embodiments. As shown in FIG. 2, the sensor circuit 140 includes a temperature sensor 210, a heating element sensor 220, and a communication circuit 230.

The temperature sensor 210 is configured to measure the temperature of the water in the water reservoir 180 of the water heater 105. In some embodiments the temperature sensor 210 could be a separate sensor that attaches to the water heater 105 to measure the temperature of the water in the water reservoir 180. In other embodiments the temperature sensor 210 could be a circuit that operates to read a temperature of the water in the water reservoir 180 detected from a different temperature sensor integral to the water heater 105. Regardless, the operation of the temperature sensor 210 will not interfere with the normal operation of the water heater 105.

The heating element sensor 220 is configured to measure a parameter of the heating element 185 that is indicative of whether the heating element 185 is on or off. For example, if the heating element 185 is an electric heating element, the measured parameter could be the current used by the electric heating element in the water heater 105 or by the water heater 105 in general. This current serves as an indicator as to whether the heating element is on or off. If the detected current used is below a current threshold, the control board 160 will determine that the electric heating element is off; and if the detected current used is above the current threshold, the control board 160 will determine that the electric heating element is on.

In alternate embodiments in which different types of heating elements 185 are used, the specific parameters of the heating element sensor 220 will vary, though the data it generates will always be indicative of whether the heating element 185 is on or off. For example, if a natural gas heating element, an oil heating element, or a coal heating element is used, the heating element sensor 220 could be a second temperature sensor that determines the temperature of a heating portion of the heating element 185. The temperature of the heating portion of the heating element could be considered an indicator that the natural gas/oil/coal heating element was turned on. If the detected temperature of the heating element was above a heating element temperature threshold, then the heating element 185 would be determined to be on; and if the detected temperature of the heating element was below the heating element temperature threshold, then the heating element 185 would be determined to be off.

Alternatively, if a natural gas or oil heating element is used, the heating element sensor 220 could be a gas/oil flow sensor to determine if natural gas is flowing to the heating element 185 from an oil/gas source. The flow of oil/natural gas could be considered an indicator that the heating element 185 was turned on. Other sensors could be used in other embodiments to detect a parameter indicative of the operation of the heating element 185.

The communication circuit 230 is configured to receive temperature data from the temperature sensor and current data from the current sensor 220 and provide that temperature data and current data to the control board 160. The communication circuit 230 could be a wired communication circuit using a wired protocol (e.g., Ethernet, RS-232, RS-485, etc.) or it could be a wireless communication circuit using a wireless protocol (e.g., WiFi, LiFi, Bluetooth, Zigbee, etc.).

Control Board

Figure 3:
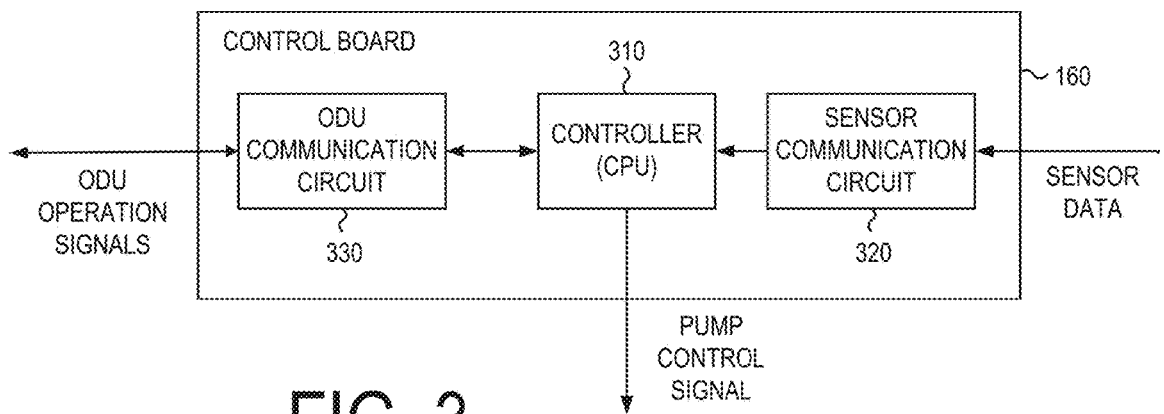
FIG. 3 is a block diagram of the control board of FIG. 1 according to disclosed embodiments.

FIG. 3 is a block diagram of the control board 160 of FIG. 1 according to disclosed embodiments. As shown in FIG. 3, the control board 160 includes a controller 310, a sensor communication circuit 320, and an ODU communication circuit 330.

The controller 310 is a circuit configured to receive data form the outdoor unit 110 and the sensor circuit 140 and to use that received data to control the operation of the components of the water-heating cabinet 115, primarily the recirculating water pump 170. The controller 310 can include a microprocessor, an application-specific integrated circuit (ASIC), or any other suitable circuit for controlling operation of the components of the water-heating cabinet 115. Although not shown, the controller 310 may also include a memory (volatile, non-volatile, or both) to store information and operating programs.

The sensor communication circuit 320 is configured to receive temperature data and current data from the communication circuit 230 in the sensor circuit 140 and to provide that temperature data and current data to the controller 310. The sensor communication circuit 320 could be a wired communication circuit using a wired protocol (e.g., Ethernet, RS-232, RS-485, etc.) or it could be a wireless communication circuit using a wireless protocol (e.g., WiFi, LiFi, Bluetooth, Zigbee, etc.).

The ODU communication circuit 330 is configured to receive outdoor unit operation data from the outdoor unit 110 and provide that operation data to the controller 310. In some embodiments the ODU communication circuit 330 is also configured to receive outdoor unit operation data from the controller 310 and provide that operation data to the outdoor unit 110. The ODU communication circuit 330 could be a wired communication circuit using a wired protocol (e.g., Ethernet, RS-232, RS-485, etc.) or it could be a wireless communication circuit using a wireless protocol (e.g., WiFi, LiFi, Bluetooth, Zigbee, etc.).

By monitoring the temperature of the water in the water reservoir 180 of the water heater 105 and the availability of hot refrigerant from the outdoor unit 110, the controller 310 in the control board 160 of the water-heating cabinet 115 can operate the water-heating cabinet 115 to draw water from the water heater 105 prior to when the water heater 105 would turn on its heating element 185 and instead heat the water via heat exchange with the hot refrigerant when it is available. In this way, the waste heat from the outdoor unit 110 can be used to warm the water in the water heater 105, saving resources (electricity, natural gas, oil, etc.) that would otherwise be consumed by the heating element 185.

Furthermore, the water-heating cabinet 115 can achieve this operation without the need to alter the operation of the water heater 105. In other words, it can be retrofitted to any existing water heater 105 without the need to change the operation or configuration of the water heater 105. In addition, the water heater 105 can still operate in its normal operation mode so that when the water-heating cabinet cannot provide heat through a heat-exchange process for any reason (e.g., hot refrigerant is not available, the water-heating cabinet 115 malfunctions, etc.), the water heater 105 can act as it normally would, keeping the water in the water heater 105 at a desired temperature using the heating element 185.

Method of Operating a Water-Heating System

Figure 4:
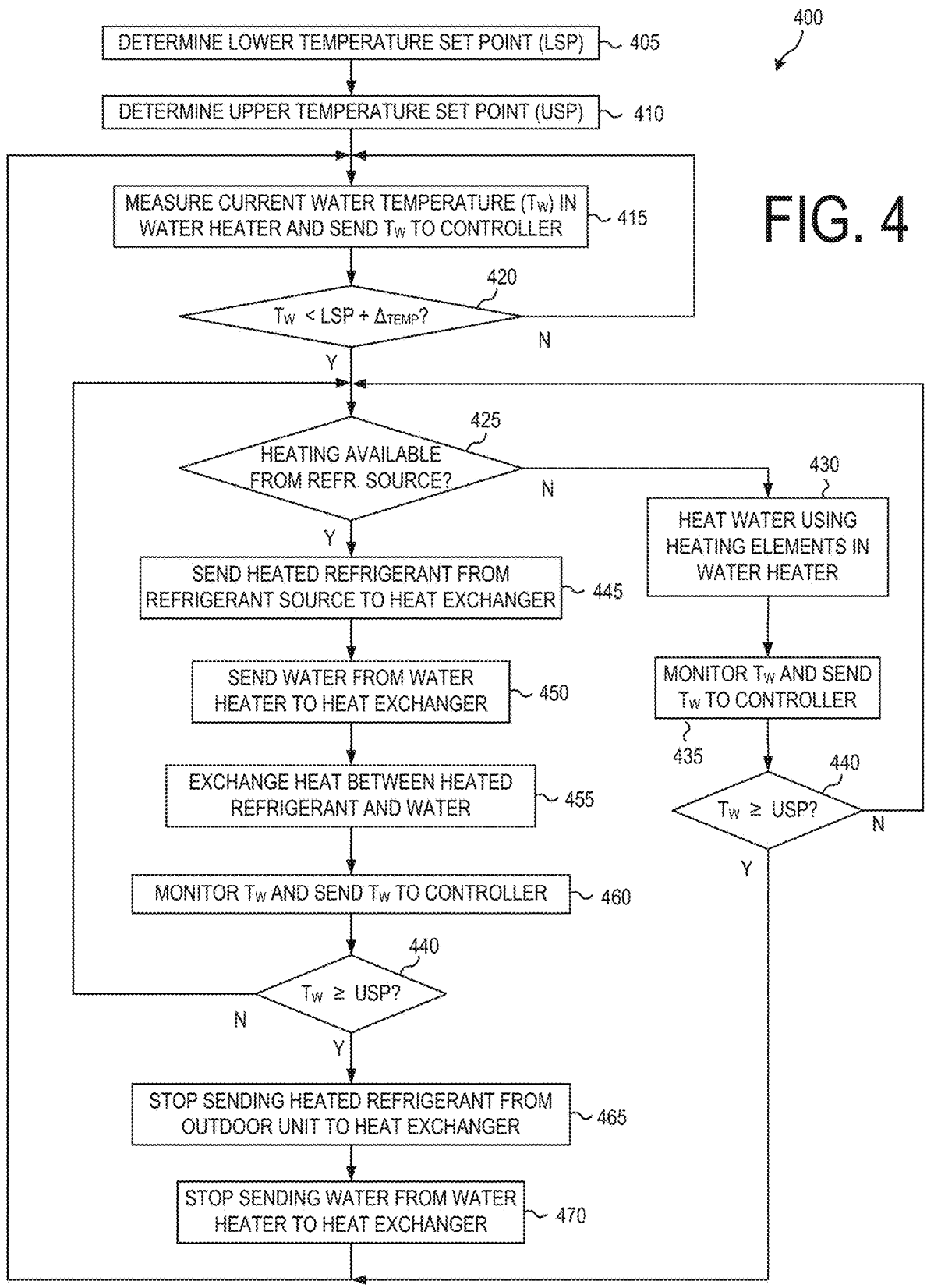
FIG. 4 is a flow chart of a water-heating system using waste heat according to disclosed embodiments.

FIG. 4 is a flow chart describing the operation 400 of a water-heating system using waste heat according to disclosed embodiments.

As shown in FIG. 4, the operation 400 begins by determining a lower temperature set point (LSP) for a water heater 105 (405), i.e., the temperature at or below which the water heater 105 turns on a heating element 185 to heat the water in a water reservoir 180 in the water heater 105. This can be achieved by monitoring normal operation of the water heater 105 and determining the temperature of the water at which the water heater 105 activates the heating element 185. This temperature represents the LSP for the water heater 105.

The system then determines an upper temperature set point (USP) for the water heater 105 (410), i.e., a temperature at or above which the water heater 105 turns off the heating element 185 after it has activated the heating element 185 to heat the water in the water reservoir 180. This can be achieved by monitoring normal operation of the water heater 105 and determining the temperature of the water at which the water heater 105 deactivates the heating element 185 after it is first activated to heat the water in the water reservoir 180. This temperature represents the USP for the water heater 105.

In this way, by monitoring the normal operation of the water heater 105 without any interference from a water-heating cabinet 115, the system can determine at what water temperature the water heater 105 is set to begin heating water (i.e., its LSP) and at what water temperature the water heater 105 is set to stop heating water (i.e., its USP).

Once the system has determined the LSP and the USP of its associated water heater 105 (405, 410), it will begin measuring the current water temperature $T_W$ of the water in the water heater 105 (415) and determining whether the current water temperature $T_W$ is below the LSP plus a temperature differential $\Delta_{TEMP}$. (i.e., is $T_W<LSP+\Delta_{TEMP}$) (420).

If the current water temperature $T_W$ is not below the LSP plus the temperature differential $\Delta_{TEMP}$, then the system continues to periodically or continually monitor the current water temperature $T_W$, (415) to determine if it is below the LSP plus a temperature differential $\Delta_{TEMP}$ (420), but otherwise takes no further action. Under these circumstances, the water in the water heater 105 is sufficiently hot that it does not require further heating.

If, however, the current water temperature $T_W$ is below the LSP plus the temperature differential $\Delta_{TEMP}$, then the water in the water heater 105 requires heating. The system therefore determines whether it can heat the water using waste heat from a refrigerant source (e.g., an outdoor unit of an air-conditioner) prior to the current water temperature $T_W$ falling low enough that the water heater 105 will activate its heating element 185. The system can act before the water heater 105 activates its heating element 185 because the system is making its determination at a temperature of (LSP+$\Delta_{TEMP}$), which is higher than the LSP alone, while the water heater 105 makes its determination to activate the heating element 185 at the LSP alone. In other words, the system is set to make its decision at a higher water temperature that occurs immediately before the water heater 105 would have activated its heating element 185.

In some embodiments the temperature differential $\Delta_{TEMP}$ can be constant. In other embodiments the temperature differential $\Delta_{TEMP}$ can vary depending upon system parameters of the water heater 105. For example, the temperature differential $\Delta_{TEMP}$ can vary based on the rate of change of the water temperature $T_W$ in the water heater. The temperature differential $\Delta_{TEMP}$ may be higher when the rate of change of the water temperature $T_W$ is high and lower when the rate of change of the water temperature $T_W$ is low.

The rate of change of the water temperature $T_W$ could be comparatively high when the residents of the building in which the water heater 105 is located are using a lot of hot water. In this case, the water-heating system may want a comparatively greater lead time to heat the water from the water heater 105 to prevent it from dropping below the LSP and triggering the water heater 105 to activate its heating element 185. As a result, the water-heating system might set the temperature differential $\Delta_{TEMP}$ to a comparatively higher level so that the system can start heating the water using the refrigerant earlier than it would with a comparatively lower value for the temperature differential $\Delta_{TEMP}$.

Likewise, the rate of change of the water temperature $T_W$ could be comparatively low when the residents of the building in which the water heater 105 is located are not using much or any hot water. If they are currently using no hot water, the drop in temperature of the water in the water heater may be solely because of heat leaking into the atmosphere from the water heater 105. In this case, the water-heating system may not need much of a lead time to heat the water from the water heater 105 since the leakage of heat to the atmosphere is typically small and slow. As a result, the water-heating system might set the temperature differential $\Delta_{TEMP}$ to a comparatively lower level so that the system will start heating the water using the refrigerant when the current water temperature $T_W$ in the water heater 105 is very close to the LSP.

In still other embodiments the temperature differential $\Delta_{TEMP}$ can vary depending upon the rate of outflow of the water from the water heater 105. The temperature differential $\Delta_{TEMP}$ may be higher when water is being drawn from the water heater 105 at a comparatively high rate and lower when water is being drawn from the water heater 105 at a comparatively lower rate or not at all. As water flows out of the water heater 105 it will have to be replaced by water at an ambient temperature, which will tend to lower the current temperature of the water $T_W$. If no water is being drawn out of the water heater 105, it is only losing heat based on what leaks out to the ambient atmosphere.

In some embodiments the temperature differential $\Delta_{TEMP}$ can vary between about 1.5° F. and 3° F., though this is by way of example only. Different embodiments can use whatever temperature differential $\Delta_{TEMP}$ is most suited to the needs of the system.

After determining that the current water temperature $T_W$ in the water heater 105 is below the LSP plus a temperature differential $\Delta_{TEMP}$, the system next determines whether heating is available from the refrigerant source (425). It may be that in some refrigerant sources there will sometimes be waste heat available and will sometimes not be waste heat available. For example, if the refrigerant source is an outdoor unit of an air-conditioner, it will have waste heat available if it is in a cooling mode, but not if it is in a heating mode. A determination that heating is available requires that the refrigerant source have sufficient waste heat that the temperature of the refrigerant that can be provided will be greater than or equal to the USP. In other words, the refrigerant must be hot enough that it can transfer some of its heat to the water.

If the system determines that there is no waste heat available, it proceeds to heat the water, as necessary, using the heating element 185 in the water heater 180 (430). Essentially, the system controller will do nothing, allowing the current water temperature $T_W$ to fall below the LSP, at which point the water heater 105 will activate its heating element to heat the water in the water heater 105.

Once the water heater 105 activates its heating element 185, the system will then measure the current water temperature $T_W$, sending the value of the current water temperature $T_W$ to a controller (430), and determine whether the current water temperature $T_W$ rises above the USP (440). In other words, the system will allow the water heater 105 to operate normally, heating the water using its heating element 185.

If the current water temperature $T_W$ has not yet risen to be equal to or greater than the USP (440), then the system will again check whether heating is available from the refrigerant source (425) and proceed accordingly.

If, however, the current water temperature $T_W$ rises to be equal to or greater than the USP (440), the water heater 105 will deactivate the heating element 185 and return to measuring the current water temperature $T_W$ (415) and determining whether it is below the LSP plus a temperature differential $\Delta_{TEMP}$ (420).

In this way, if heating is not available from the refrigerant source (425), the water heater 105 will operate exactly as it would have if the water-heating system not been in place. The water in the water reservoir 180 in the water heater 105 will be heated by the heating element 185 and the occupant of the building in which the water heater 105 is located will get the hot water they desire.

If there is heating available from the refrigerant source, however (425), the system will proceed to use the hot refrigerant to heat the water in the water heater 105. Furthermore, because this operation was triggered by the current water temperature $T_W$ falling below the LSP plus the temperature differential $\Delta_{TEMP}$, it will occur before the water heater 105 has a chance to activate its heating element 185, which occurs when the current water temperature $T_W$ falls below the LSP.

The system sends heated refrigerant from the refrigerant source to a refrigerant side of a refrigerant-water heat exchanger 165 (445) and sends water from the water heater 105 to a water side of the refrigerant-water heat exchanger 165 (450). Heat is then exchanged between the hot refrigerant and the relatively cooler water (455), causing the refrigerant to become cooler and the water to become hotter.

As this is occurring, the system continues to periodically or continually measure the current water temperature $T_W$, sending the value of the current water temperature $T_W$ to a controller (460), and determine whether the current water temperature $T_W$ rises above the USP (440). In other words, the system will continue to heat the water using the hot refrigerant rather than the heating element 185.

If the current water temperature $T_W$ has not yet risen to be equal to or greater than the USP (440), then the system will again check whether heating is available from the refrigerant source (425) and proceed accordingly. If there continues to be heating available from the refrigerant source, the water heating system will continue to use the hot refrigerant to heat the water.

If, however, the current water temperature $T_W$ rises to equal to or greater than the USP (440), the water heater 105 system will stop sending heated refrigerant from the refrigerant source to the refrigerant-water heat exchanger 165 (465) and will stop sending water from the water heater 105 to the refrigerant-water heat exchanger (470). It will then return to measuring the current water temperature $T_W$ (415) and determining whether it is below the LSP plus a temperature differential $\Delta_{TEMP}$ (420). In this situation the system will have fully heated the water in the water heater 105 to the USP, allowing the system to wait until the water has again dropped below the LSP plus the temperature differential $\Delta_{TEMP}$ until action must again be taken.

In this way, if heating is not available from the refrigerant source (425), the water heater 105 will operate exactly as it would have if the water-heating system not been in place. The water in the water reservoir 180 in the water heater 105 will be heated and the occupant of the building in which the water heater 105 is located will get the hot water they desire. However, if heating is available, the system will begin heating water from the water heater 105 using the hot refrigerant just before the water heater 105 would have activated its heating unit. In other words, the system can prevent the water heater 105 from expending the resources required by the heating element 185 (e.g., electric power, natural gas, oil, etc.) and can instead heat the water using the waste heat from the refrigerant source. This can save those resources and thereby save the building owner or operator money.

Determining LSP and USP

To operate properly, a water heater 105 will either have a value for both a lower temperature set point (LSP) and an upper temperature set point (USP) known to a local water heater controller or will have a value for one of the LSP and the USP known to the local water heater controller and will have a way off deriving the value of the other of the LSP and the USP. For example, in one embodiment the water heater 105 could have a set value for the USP and a rule to set the LSP to be 20% or 25% lower than the USP. In another embodiment the water heater 105 could have a set value for the USP and a standard value for the LSP (e.g., 90° F.). In yet another embodiment the water heater 105 could have a temperature value set from which both the LSP and the USP are derived. Other ways of determining the LSP and USP are possible.

However, a water heater 105 may not have any mechanism provided for communicating its associated LSP and USP with a component outside of the water heater 105. If an external controller is to coordinate an exchange of heat between a refrigerant from a refrigerant source and water in such a water heater 105, it would therefore be useful to have a way of determining the values for the LSP and USP for the water heater 105 without requiring that the water heater 105 be modified to provide that information.

Figure 5:
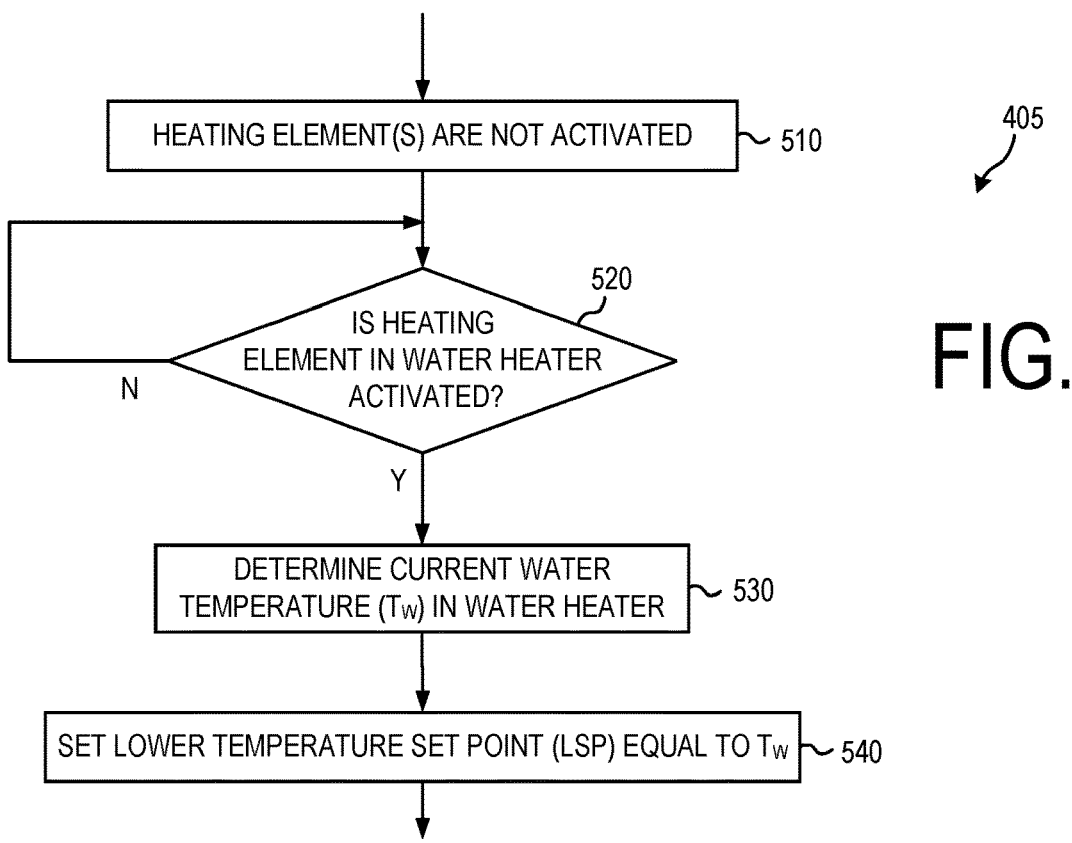
FIG. 5 is a flow chart describing the operation of determining a lower temperature set point in FIG. 4 according to disclosed embodiments.

FIG. 5 is a flow chart describing the operation of determining an LSP for a water heater 105 (405) in FIG. 4 according to disclosed embodiments. This operation can be performed by a system controller separate from the water heater 105 without any action being taken on the part of the water heater 105.

As shown in FIG. 5, this operation begins at a point when a heating element 185 in the water heater 105 is not activated (510), i.e., the water heater 105 is not currently heating the water it contains.

The system then monitors the heating element 185 to determine whether it is activated (520). It can use a detector such as the heating element detector 220 described above or any suitable detector. If the heating element 185 is not activated, then the system continues monitoring the heating element 185. If it is activated, then the system determines the current water temperature $T_W$ in the water heater 105 at the time when the heating element was activated (530).

The system then sets the LSP to be equal to the current water temperature $T_W$ in the water heater 105 at the time when the heating element was activated (540).

In other words, the system monitors the temperature of the water in the water heater 105 when its heating element 185 is turned off until it reaches a point when the heating element 185 turns on. Since the water heater 105 is configured to turn the heating element 185 on when its water temperature reaches the LSP, the water temperature $T_W$ when the water heater 105 turns on the heating element 185 will correspond to the LSP for the water heater 105 stored in a water heater controller.

In this way, the system can determine the LSP for the water heater 105 simply by observation without the water heater 105 having to provide any information to a system controller. Thus, if an embodiment of a water heating system includes a water heater 105 without the capability to externally communicate its LSP, a system controller external to the water heater 105 can determine the LSP of the water heater 105 without requiring any modification to the water heater 105.

Figure 6:
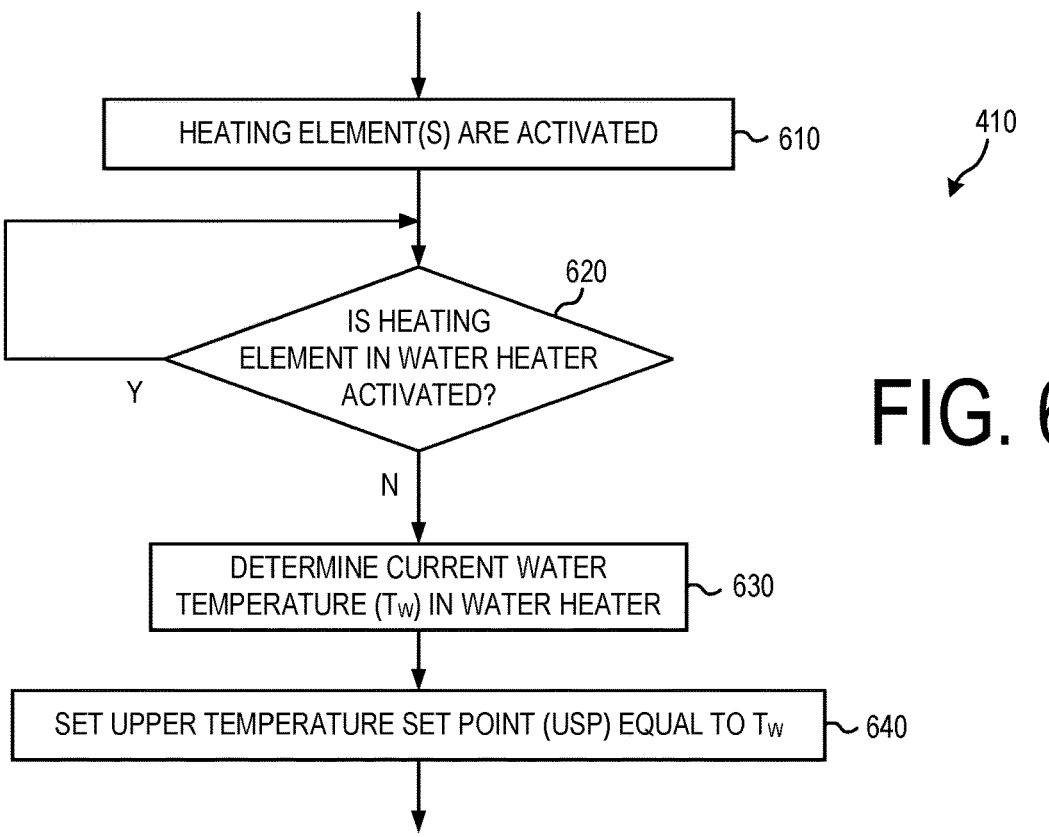
FIG. 6 is a flow chart describing the operation of determining an upper temperature set point in FIG. 4 according to disclosed embodiments.

FIG. 6 is a flow chart describing the operation of determining a USP for a water heater 105 (410) in FIG. 4 according to disclosed embodiments. This operation can be performed by a system controller separate from the water heater 105 without any action being taken on the part of the water heater 105.

As shown in FIG. 6, this operation begins at a point when a heating element 185 in the water heater 105 is activated (610), i.e., the water heater 105 is currently heating the water it contains.

The system then monitors the heating element 185 to determine whether it is activated (620). This could use a heating element detector 220 as described above, or any suitable detector. If the heating element is activated, then the system continues monitoring the heating element 185. If it is not activated, then the system determines the current water temperature $T_W$ in the water heater 105 at the time when the heating element was deactivated (630).

The system then sets the USP to be equal to the current water temperature $T_W$ in the water heater 105 at the time when the heating element was deactivated (640).

In other words, the system monitors the temperature of the water in the water heater 105 when its heating element 185 is turned on until it reaches a point when the heating element 185 turns off. Since the water heater 105 is configured to turn the heating element 185 off when its water temperature reaches the USP, the water temperature $T_W$ when the water heater 105 turns off the heating element 185 will correspond to the USP for the water heater 105 stored in a water heater controller.

In this way, the system can determine the USP for the water heater 105 simply by observation without the water heater 105 having to provide any information to a system controller. Thus, if an embodiment of a water heating system includes a water heater 105 without the capability to externally communicate its USP, a system controller external to the water heater 105 can determine the USP of the water heater 105 without requiring any modification to the water heater 105.

Determining Whether Heating Elements are Activated

Generally, the heating element 185 in a water heater 105 is the component that consumes the most energy. As a result, when an electric heating element is used and the heating element 185 is activated, the current provided to the water heater 105 will increase significantly. A water-heating system with an electric heating element therefore uses the current supplied to the water heater 105 as an indicator as to whether the heating element 185 is activated. If the current is above a current threshold then the heating element 185 is determined to be activated; and if the current is below the current threshold then the heating element 185 is determined to not be activated. The current threshold is selected such that it differentiates between the current used by the water heater 105 when the heating element 185 is not activated and the current used by the water heater 105 when the heating element 185 is activated.

Figure 7:
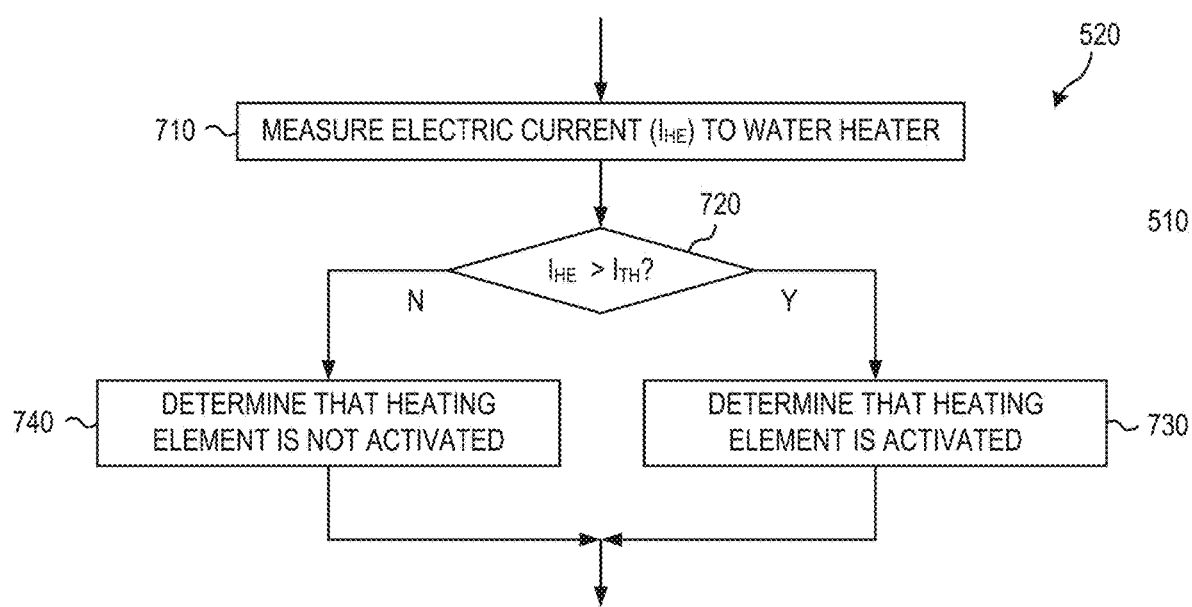
FIG. 7 is a flow chart describing the operation of determining whether a heating element in a water heater is activated in FIGS. 5 and 6 according to disclosed embodiments.

FIG. 7 is a flow chart describing the operation 520 of determining whether a heating element 185 in a water heater 105 is activated in FIGS. 5 and 6 according to disclosed embodiments. Specifically, FIG. 7 show an embodiment in which the heating element 185 is an electric heater.

As shown in FIG. 7, the operation 520 begins by measuring an electric current $I_{HE}$ being provided to the water heater 105 (710).

The system then compares the measured electric current $I_{HE}$ with a threshold current $I_{TH}$ to determine whether the measured electric current $L_{IE}$ is greater than the threshold current $I_{TH}$ (720).

If the electric current $I_{HE}$ is above the threshold current $I_{TH}$, then the system determines that the heating element 185 is activated (730). If the electric current $I_{HE}$ is below the threshold current $I_{TH}$, then the system determines that the heating element 185 is not activated (740).

In this way, the system can determine whether the heating element 185 is activated simply by observation without the water heater 105 having to provide any information to a system controller. Thus, if an embodiment of a water heating system includes a water heater 105 without the capability to externally communicate the status of its heating element 185, a system controller external to the water heater 105 can determine whether the heating element 185 in the water heater 105 is activated without requiring any modification to the water heater 105.

Although FIG. 7 discloses measuring the current flowing to the water heater 105 in general, alternate embodiments could measure the current being provided only to the heating element 185 in the water heater 105.

Although FIG. 7 discloses a specific embodiment in which the heating element 185 in a water heater 105 is an electric heater, this is by way of example only. Alternate embodiments could use different operations to determine whether a heating element 185 is activated for other types of heating elements 185.

For example, the system could measure the temperature of the heating element 185 and compare it to a threshold temperature, determining that the heating element 185 was activated if its temperature was above a temperature threshold and determining that the heating element 185 was not activated if its temperature was below the temperature threshold. Likewise, the system could monitor the flow of natural gas or oil in a natural gas or oil heating element, determining that the heating element 185 was activated if its gas or oil flow was above a flow threshold and determining that the heating element 185 was not activated if its gas or oil flow was below the flow threshold. Other operations to determine whether the heating element 185 is activated would also be possible.

Identifying when a Low Temperature Setpoint has Risen after being Set

Over time the LSP and USP in a hot water heater 105 may change, i.e., from $LSP_{OLD}$ and $USP_{OLD}$ to $LSP_{NEW}$ and $USP_{NEW}$. For example, in a home environment a homeowner might decide to alter how hot they want the water in their water heater 105 to be. Likewise, in an industrial environment the required hot water temperature needs of an industrial process may change over time.

To maintain the efficiency of a water-heating process, it is desirable to take steps to make certain that a system controller is aware of any changes to the LSP and USP so that it can use current values for LSP and USP in operation. This will allow the system to begin and end its heat transfer process at the appropriate times, and avoids having the heating element 185 activated when hot refrigerant is available to heat the water in the water heater 105.

For example, if the LSP of a water heater 105 is lowered (i.e., $LSP_{NEW} < LSP_{OLD}$), then a system using the old LSP ($LSP_{OLD}$) may act to heat the water in the water heater 105 sooner than it needs to, since the refrigerant-water heat transfer system will begin heating water through heat transfer with a refrigerant when the current water temperature falls below the (higher) $LSP_{OLD}$ plus the temperature differential $\Delta_{TEMP}$ rather than when the water temperature falls below the (lower) $LSP_{NEW}$ plus the temperature differential $\Delta_{TEMP}$. This can be inefficient, but it still has the system implementing a heat transfer operation prior to the water heater 105 activating its heating element 185.

However, if the LSP of the water heater 105 is raised, then the system may fail to act quickly enough to heat the water in the water heater 105 using heat transfer with a refrigerant before the water heater 105 activates its heating element 185. This is because the water heater 105 will activate the heating element 185 when the current water temperature drops below the (higher) $LSP_{NEW}$, while the refrigerant-water heat transfer system will begin heating the water by heat transfer when the current water temperature drops below the (lower) $LSP_{OLD}$ plus the temperature differential $\Delta_{TEMP}$. The water heater 105 will activate the heating element 185 before the refrigerant-water heat transfer system begins heating water using a heat transfer operation if the (higher) $LSP_{NEW}$ is greater than the (lower) $LSP_{OLD}$ plus the temperature differential $\Delta_{TEMP}$.

Figure 8:
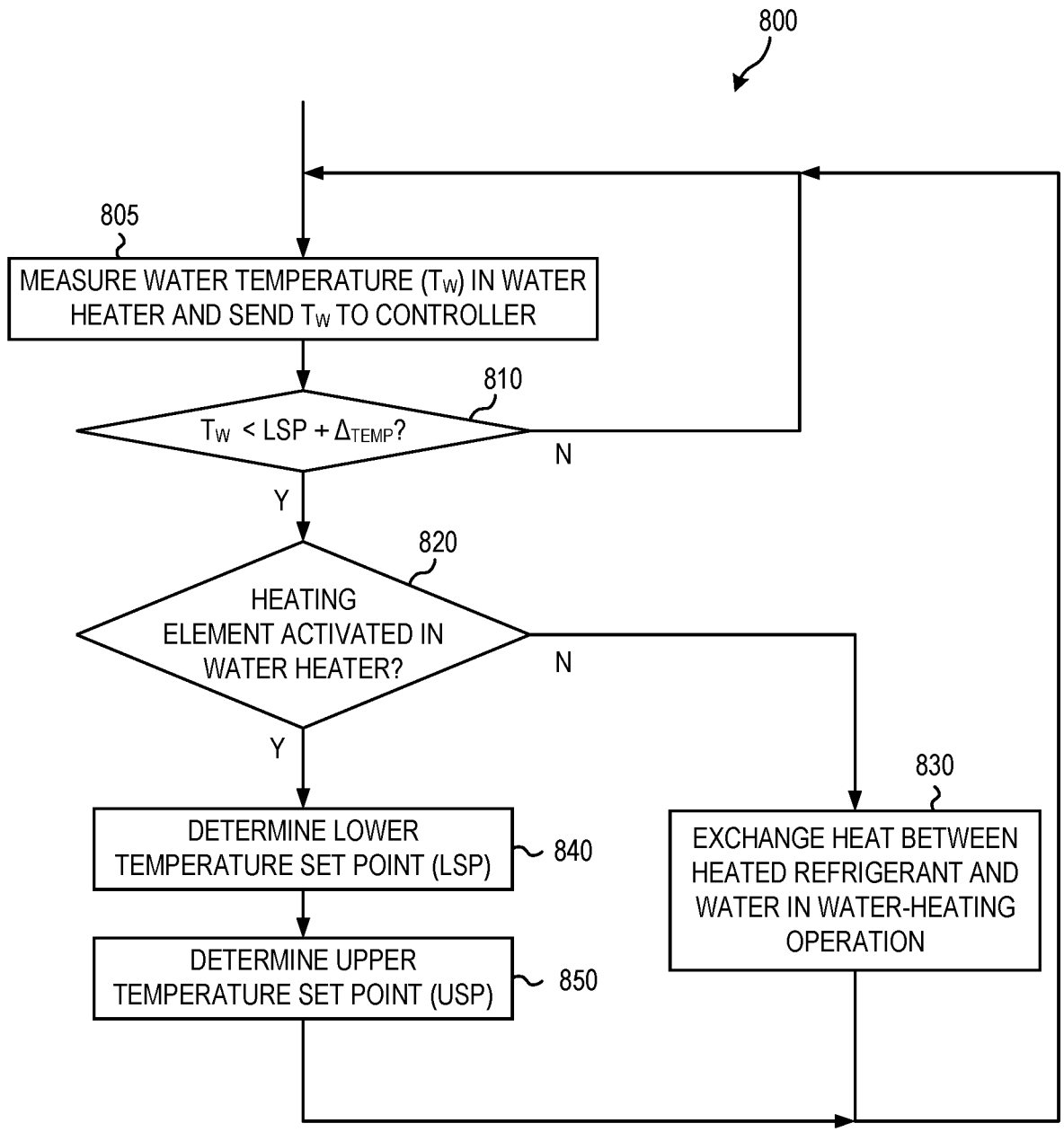
FIG. 8 is a flow chart describing an operation of identifying when a low temperature setpoint has risen after being set according to disclosed embodiments.

To keep operating efficiently, and to avoid the above problems, the water-heating system may continually or periodically monitor the hot water heater 105 to determine whether the LSP of the hot water heater 105 has been raised. FIG. 8 is a flow chart describing the operation 800 of identifying when a low temperature setpoint (LSP) has risen after being set.

As shown in FIG. 8, the system begins by measuring the current water temperature $T_W$ in the water heater 105 and sending the measured temperature $T_W$ to a system controller (805) and by determining whether the current water temperature $T_W$ is below the currently stored LSP plus a temperature differential $\Delta_{TEMP}$. (i.e., is $T_W < LSP + \Delta_{TEMP}$) (810).

Operation 805 is comparable to operation 415 in the method 400 of FIG. 4, and the description pertaining to operation 415 applies to the operation 805 of FIG. 8. Operation 810 is comparable to operation 420 in the method 400 of FIG. 4, and the description pertaining to operation 420 applies to the operation 810 of FIG. 8.

If the current water temperature $T_W$ is not below the LSP plus the temperature differential $\Delta_{TEMP}$, then the system continues to monitor the current water temperature $T_W$, (805) to determine if it is below the LSP plus a temperature differential $\Delta_{TEMP}$ (810), but otherwise takes no further action. Under these circumstances, the water in the water heater 105 is sufficiently hot that it does not require further heating.

If, however, the current water temperature $T_W$ is below the LSP plus the temperature differential $\Delta_{TEMP}$, then the system determines whether the heating element 185 in the water heater 105 is already activated (820).

If the heating element 185 is not already activated, then the system will then proceed to exchange heat between heated refrigerant and water in a water-heating operation as described above (830). One way of achieving this is through operations 445-470 described with respect to FIG. 4. Once this heat exchange operation is complete, the system returns to monitoring the current water temperature $T_W$, (805) to determine if it is below the LSP plus the temperature differential $\Delta_{TEMP}$ (810).

If, however, the heating element 185 in the water heater 105 is already activated when the system determines that the current water temperature $T_W$ is below the LSP plus the temperature differential $\Delta_{TEMP}$, it is likely that the LSP for the water heater 105 has been raised. This would cause the hot water heater 105 to activate the heating element 185 at a new LSP that is higher than a currently stored LSP known by the system plus the temperature differential $\Delta_{TEMP}$.

In this case, the system will determine a new LSP for the hot water heater 105 (840) and determine a new USP for the hot water heater 105 (850). The operations of determining a new LSP for the hot water heater 105 (840) and determining a new USP for the hot water heater 105 (850) are comparable to the operations of determining a new LSP for the hot water heater 105 (405) and determining a new USP for the hot water heater 105 (410), respectfully, as described above with respect to FIGS. 4-6. All the description regarding operations 405 and 410 apply to operations 840 and 850, respectfully, including the descriptions of their operation with respect to FIGS. 5 and 6. The operation of determining a new LSP for the hot water heater 105 (840) can be performed as described for the comparable operation of determining a new LSP for the hot water heater 105 (405) in FIG. 5. Likewise, the operation of determining a new USP for the hot water heater 105 (850) can be performed as described for the comparable operation of determining a new USP for the hot water heater 105 (410) in FIG. 6.

Once new values for the LSP and the USP have been determined, the system stores these values in a memory and returns to monitoring the current water temperature $T_W$, (805) to determine if it is below the new LSP plus the temperature differential $\Delta_{TEMP}$ (810).

In this way, the system can adjust its stored LSP value to the new, higher LSP used by the water heater 105 so that the system will continue to perform the heat-exchanging operation prior to the water heater 105 activating the heating element 185.

This operation of monitoring the LSP of the water heater 105 to see if it has been raised can be performed coincident with the measurement process 410 described above with respect to the process of FIG. 4. For example, the operation of determining whether the heating element 185 in the water heater 105 has been activated after determining that the current water temperature $T_W$ is below the new LSP plus the temperature differential $\Delta_{TEMP}$ (820) can be inserted into the process described in FIG. 4 between operations 420 and 425. In this case, the decision-making operation 820 will move processing to operations 840 and 850 if the system determines that the heating element 185 is activated and will move processing to operation 425 if the system determines that the heating element 185 is not activated.

Periodically Reevaluating the LSP and the USP

Since the LSP and USP in the water heater 105 may change from time-to-time, the system may also be configured to periodically check the values for the LSP and USP of the water heater 105 regardless of whether the temperature of the water in the water heater 105 has dropped below the LSP plus the temperature differential $\Delta_{TEMP}$. In this way the system can maintain a current value for the LSP and USP independent of the operation of the water heater 105.

Figure 9:
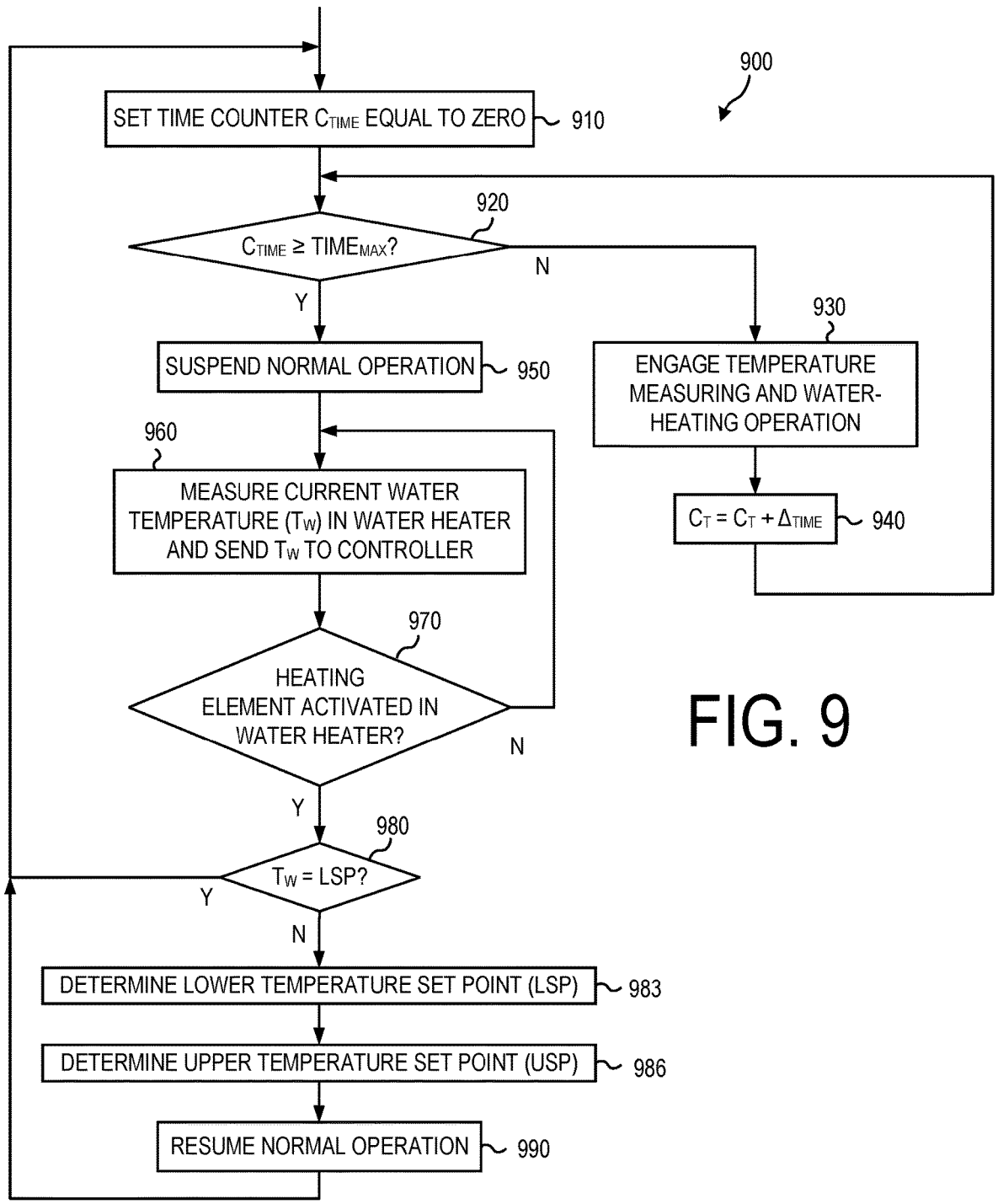
FIG. 9 is a flow chart describing an operation of periodically reevaluating a low temperature set point and an upper temperature setpoint according to disclosed embodiments.

FIG. 9 is a flow chart describing the operation 900 of periodically reevaluating the low temperature set point (LSP) and the upper temperature setpoint (USP) according to disclosed embodiments.

As shown in FIG. 9, the operation 900 begins by setting a time counter $C_{TIME}$ equal to zero (910). This time counter is used to determine when the system should update its values for LSP and USP.

The process continues by monitoring the time counter $C_{TIME}$ and determining whether it is greater than or equal to a maximum time $TIME_{MAX}$ (920). The value for $TIME_{MAX}$ can be selected to be a maximum time that the system should go from the last time it determined the LSP and USP values for the water heater 105 to the next time it updates the values for the LSP and USP. Although not specifically shown in FIG. 9, the system can be configured to reset the time counter $C_{TIME}$ to zero any time the system determines a new value for the LSP and the USP of the water heater 105.

If the time counter $C_{TIME}$ is lower than the maximum time $TIME_{MAX}$, then the system will continue to engage in its normal temperature measuring and water-heating operation (930) as set forth, by way of example, in FIG. 4.

Then the system will increment the value for the time counter $C_{TIME}$ (940) and continue to evaluate whether the time counter $C_{TIME}$ is greater than or equal to the maximum time $TIME_{MAX}$ (920). In this way the system will maintain its normal temperature measuring and water-heating operation from when the time counter $C_{TIME}$ is reset to when it reaches the maximum time $TIME_{MAX}$.

If the time counter $C_{TIME}$ is greater than or equal to the maximum time $TIME_{MAX}$, then the system will suspend normal operation (950), measure the current water temperature $T_W$ in the water heater 105 (960), and begin monitoring the heating element 185 in the water heater 105 to see if it has been activated (970). In doing this, the system can determine at what water temperature $T_W$ the water heater 105 activates the heating element 105.

If the system determines that the water heater 105 has not been activated, it will again measure the current water temperature $T_W$ in the water heater 105 (960) and continue monitoring the heating element 185 in the water heater 105 to see if it has been activated (970). It will continue these operations until the water heater 105 activates the heating element 185.

If the system determines that the heating element 185 has been activated, it will then determine whether the current water temperature $T_W$ is equal to the current LSP the system has stored (970). In other words, the system will determine whether the water heater 105 has activated the heating element 185 when the water temperature in the water heater 105 was equal to the currently stored value for the LSP.

The determination as to whether the current water temperature $T_W$ is equal to or less than the current LSP can have a certain tolerance in various embodiments. In other words, the system can determine whether the current water temperature $T_W$ is equal to or less than the current LSP based on a small tolerance value for $T_W$. This can be done to prevent the system from reevaluating the LSP and USP values based only on a tiny variance in the current water temperature $T_W$ at which the water heater 105 activates the heating element 185. The tolerance value should preferably be less than the temperature differential $\Delta_{TEMP}$.

If the system determines that the current water temperature $T_W$ is equal to the current LSP then it will reset the time counter $C_{TIME}$ to zero (910), starting the process 900 all over again. In this situation the system will have determined that the currently stored LSP value remains valid since the LSP value is intended to represent the water temperature at which the water heater 105 activates the heating element 185. As a result, there is no need for the system to redetermine the LSP value.

If the system determines that the current water temperature $T_W$ is not equal to the current LSP then it will newly determine the LSP and USP for the water heater 105 (983, 986) and then reset the time counter $C_{TIME}$ to zero (910), starting the process 900 all over again. In this situation the system will have determined that the currently stored LSP value is no longer valid since the water heater 105 is activating the heating element 185 at a water temperature different from the LSP value stored by the heat transfer system.

The operations of determining a new LSP for the hot water heater 105 (983) and determining a new USP for the hot water heater 105 (986) are comparable to the operations of determining a new LSP for the hot water heater 105 (405) and determining a new USP for the hot water heater 105 (410), respectfully, as described above with respect to FIGS. 4-6. All the description regarding operations 405 and 410 apply to operations 983 and 986, respectfully, including the descriptions of their operation with respect to FIGS. 5 and 6. The operation of determining a new LSP for the hot water heater 105 (983) can be performed as described for the comparable operation of determining a new LSP for the hot water heater 105 (405) in FIG. 5. Likewise, the operation of determining a new USP for the hot water heater 105 (986) can be performed as described for the comparable operation of determining a new USP for the hot water heater 105 (410) in FIG. 6.

The operation 900 of FIG. 9 shows that the system only actively determines whether the value for the stored LSP is correct, not the value for the stored USP. This is because when the stored LSP value is too low, the system may fail to initiate a heat transfer operation prior to the water heater 105 activating the heating element 185, wasting system resources. No similar problem will occur if the stored USP value is incorrect.

However, alternate embodiments can modify this operation 900 to monitor whether the USP value is incorrect as well. For example, the system could also monitor the current water temperature $T_W$ when the water heater 105 has deactivated the heating element 185 after having previously activated it. This deactivation water temperature is indicative of the USP value stored in the water heater 105. It can be compared to the USP value stored by the heat transfer system to determine whether the stored USP value is correct. In such an embodiment, the system can redetermine values for LSP and USP when either the stored LSP value is determined to no longer correspond to the LSP value used by the water heater 105 or the stored USP value is determined to no longer correspond to the USP value used by the water heater 105.

Although FIG. 9 discloses discrete operations for checking whether the time counter $C_{TIME}$ is greater than the maximum time $TIME_{MAX}$ (920), engaging in the temperature measuring and water-heating operation (930), and incrementing the time counter CT (940), in some embodiments these operations can be performed using a timer and circuitry that monitors the value of the timer. The water-heating system can operate normally in parallel with the timer while the timer's value is below the maximum time $TIME_{MAX}$. Then, when the monitoring circuitry determines that the timer has reached the maximum time $TIME_{MAX}$, the system can suspend normal operation 950 and proceed with operations 950-970, 405, 410, and 980 as shown in FIG. 9. The system will then zero out the timer and start the process all over again.

Determining Whether a Refrigerant Source has Heated Refrigerant Available

Figure 10:
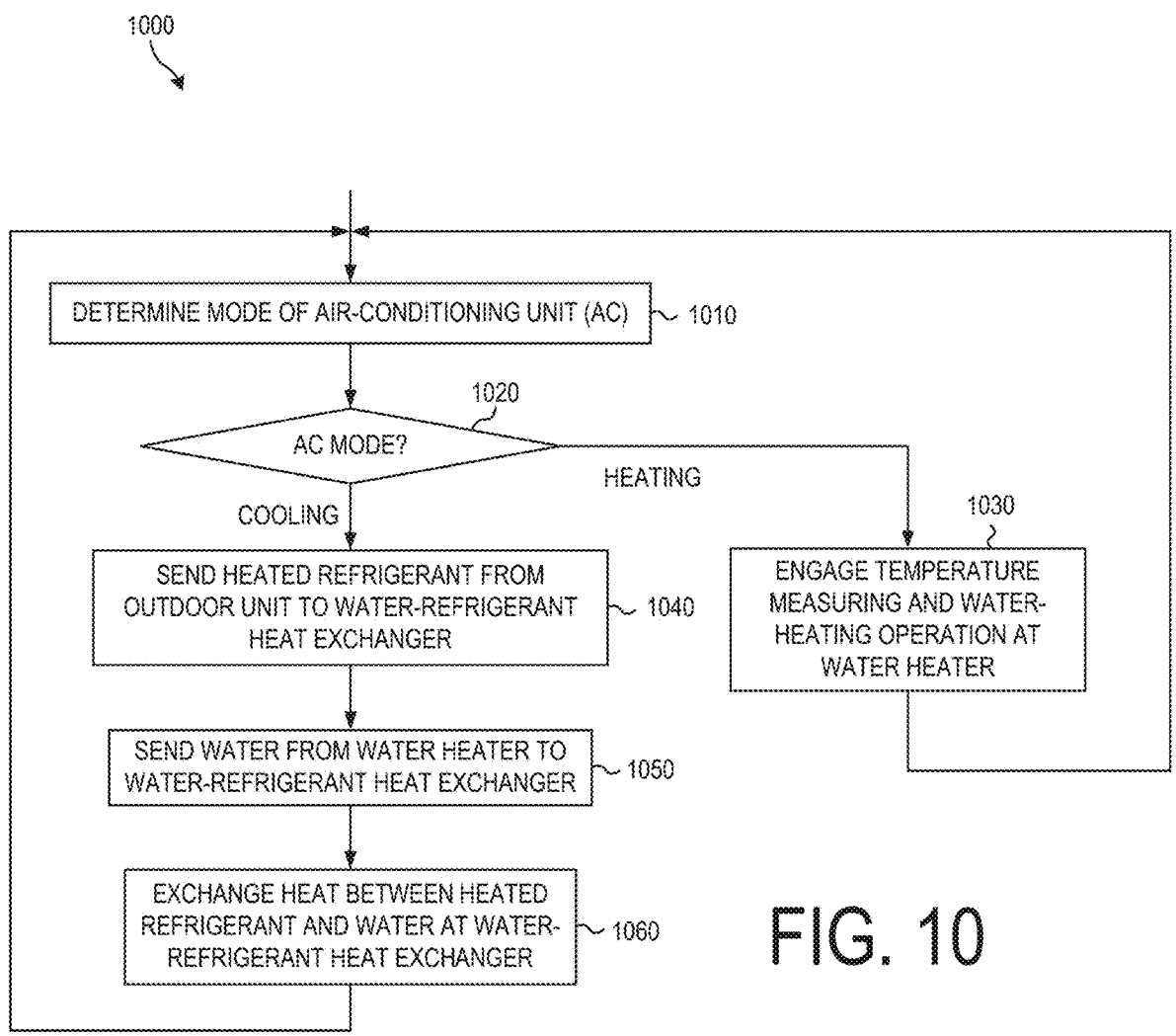
FIG. 10 is a flow chart describing an operation of determining whether an outdoor unit of an air-conditioner has heated refrigerant available for heat transfer according to disclosed embodiments

For the heat transfer system to transfer heat from a refrigerant source to the water in the water heater 105 (operation 455 of FIG. 4), the refrigerant source must first have sufficiently hot refrigerant available for heat transfer. FIG. 10 is a flow chart describing the operation 1000 of determining whether an outdoor unit of an air-conditioner has heated refrigerant available for heat transfer according to disclosed embodiments.

The operation 1000 of FIG. 10 assumes that water in the water heater 105 requires heating and that the system is therefore determining whether there is heated refrigerant available to heat the water. Therefore, it does not disclose an operation to determine whether the water in the water heater 105 requires heating.

As shown in FIG. 10, the operation 1000 begins by determining the mode in which the outdoor unit of the air-conditioner is operating (1010). These modes include a cooling mode when the outdoor unit is providing relatively cool refrigerant to an interior portion of the air-conditioning system to cool air within a building, and a heating mode when the outdoor unit is providing relatively warm refrigerant to the interior portion of the air-conditioning system to warm air within the building.

When the outdoor unit is in the cooling mode, the refrigerant will absorb heat from inside the building and will have to dissipate that heat somewhere (typically into outside ambient air). As a result, the outdoor unit should have sufficiently hot refrigerant whose heat has to be dissipated before the refrigerant can be cooled sufficiently to be provided to the indoor component of the air-conditioning system. In contrast, when the outdoor unit is in the heating mode, the refrigerant will absorb heat from an external heat source. The heated refrigerant will be provided to the indoor portion of the air-conditioning system to warm the air inside the building. As a result, although the outdoor unit will have heated refrigerant, that heated refrigerant must be provided to the indoor portion of the air-conditioning system. It is not considered waste heat that can be used to heat water from the water heater 105. Thus, it is only when the outdoor unit is in a cooling mode that it will have waste heat that needs to be dissipated in the form of a hot refrigerant.

The system therefore determines whether the outdoor unit is in a cooling mode or a heating mode (1020).

If the outdoor unit is in a heating mode, then it will not have waste heat to transfer to water from the water heater 105. In this case, the system will allow the water heater 105 to engage in a temperature measuring and water heating operation without interference (1030). The water heater 105 will then use its heating element 185 to heat the water inside the water heater 105 as needed according to normal operation parameters.

If the outdoor unit is in a cooling mode, then it will have waste heat available to transfer to water from the water heater 105. In this case, the system will proceed to transfer that waste heat to the water from the water heater 105. Furthermore, since this waste heat does not consume resources (e.g., electric power, natural gas, oil, etc.) to generate, the system need not limit itself to only heating the water from the water heater 105 to the USP. The system can transfer as much waste heat as it can to the water from the water heater 105 without significantly increasing the cost of system operation.

Once it determines that the air-conditioning unit is in a cooling mode, the system therefore sends heated refrigerant from the outdoor unit 110 to a refrigerant-water heat exchanger 165 (1040), sends water from the water heater 105 to the refrigerant-water heat exchanger 165 (1050), and exchanges heat between the refrigerant and the water in the refrigerant-water heat exchanger 165 (1060). The system then again determines the mode of the air-conditioning unit (1010) and checks whether it is in a heating or cooling mode (1020) to make certain whether there is still waste heat to transfer to the water from the water heater 105.

In this way, the outdoor unit 110 can provide hot refrigerant to heat the water in the water heater 105 when the outdoor unit 110 is in a cooling mode.

In alternate embodiments, the system can be configured to determine whether the water in the water heater 105 needs heating and then only provide refrigerant to transfer heat to the water from the water heater 105 when heating is required. For example, a resident of a building with a water heater 105 may determine that he USP in the water heater 105 is a maximum desired temperature for the water in the water heater 105. This could happen, for example, if the building were a residential home and the resident was the parent of a small child. The parent might desire to limit the maximum temperature of the water in the water heater 105 to prevent their child from being scalded by hot water out of a faucet.

In such a case, the system could be configured such that when it determined that the air-conditioning unit was in a cooling mode (1020), it would then measure the water temperature $T_W$ in the water heater 105 and determine whether the water temperature $T_W$ in the water heater 105 was greater than or equal to the USP. If the water temperature $T_W$ was determined to be under the USP then the water in the water heater 105 would be below the set maximum temperature and should be heated. The system would then send heated refrigerant from the outdoor unit to the water refrigerant heat exchanger (1040), send water from the water heater 105 to the water refrigerant heat exchanger (1050), and exchange heat between the heated refrigerant and the water (1060) to heat the water with the waste heat from the outdoor unit. If, however, the water temperature $T_W$ was determined to be greater than or equal to the USP then the water temperature would be at or above its maximum temperature and the system would not perform operations 1040-1060. Instead, it would return to determining the mode of the air-conditioning unit (1010) and proceeding accordingly.

Although FIG. 10 illustrates the operation of an embodiment in which a refrigerant source is an outdoor unit 110 of an air-conditioner, this is by way of example only. If a different refrigerant source is used, then a different operation may be required for determining whether the refrigerant source has sufficient hot refrigerant for heat transfer with water from the water heater 105.

By using the disclosed operations, a water-heating system can use waste heat from a refrigerant source to heat the water in a water heater 105. It does so by determining when the water heater 105 would otherwise heat the water it contains using a heating element 185 and then heating the water in the water heater 105 using heat exchange with the hot refrigerant at a temperature just above the temperature at which the water heater 105 would activate the heating element 185. In this way the system can heat the water in the water heater 105 as needed using the waste heat as a heat source, while at the same time saving resources (e.g., electrical power, fuel, etc.) that the heating element 185 would otherwise consume in heating the water in the water heater 105 using the heating element 185.

Furthermore, since the water-heating system acts just before the water heater 105 would otherwise have activated the heating element 185, the operation should be effectively seamless, heating the water just as the water heater 105 would. As a result, the resident of a building that contains the water heater 105 should detect no difference in the operation of the water heater 105 regardless of how the water is heated.

The disclosed water-heating system and methods also allow the modification of a conventional water heater 105 to include the ability to heat the water in the water heater 105 using waste heat in the refrigerant without having to modify the water heater 105 in any significant way. A water-heating cabinet 115 can be connected between a refrigerant source and the water heater 105 using existing components in a conventional water heater 105. The water-heating cabinet 115 can be connected to an existing tank drain valve 150 and pressure relief valve 155, and a sensor circuit 140 can be attached to the outside of the water heater 105 with minimal effort.

In addition, the water-heating cabinet 115 doesn't actually interfere with the operation of the water heater 105. It simply monitors the operation of the water heater 105 and heats the water in the water heater 105 just before the water heater 105 will heat it using the heating element 185. As a result, if the water-heating cabinet 115 can't heat the water for any reason (e.g., it doesn't have sufficient heated refrigerant, it suffers a malfunction, etc.), the water heater 105 will operate as it would have without the presence of the water-heating cabinet 115 and the residents of the building to which the water heater 105 is attached will still have their water heated and will suffer no interruption in their supply of hot water.

Thus, the disclosed system and method can save resources (electrical power, fuel, etc.), which can save money for the operator of the water heater 105. However, these savings will only occur when they are possible. When they are not, the water heater 105 will operate as it otherwise would have.

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A water-heating system, comprising:
a controller;
a refrigerant-water heat exchanger configured to exchange heat between refrigerant and water;
a temperature sensor configured to measure a current water temperature of water in a water heater and provide the current water temperature to the controller;
a first refrigerant pipe configured to pass the refrigerant from a refrigerant source to the refrigerant-water heat exchanger;
a second refrigerant pipe configured to pass the refrigerant from the refrigerant-water heat exchanger to the refrigerant source;
a first water pipe configured to pass the water from the water heater to the refrigerant-water heat exchanger;
a second water pipe configured to pass the water from the refrigerant-water heat exchanger to the water heater; and
a water pump configured to pump water from the water heater to the refrigerant-water heat exchanger via the first water pipe and from the refrigerant-water heat exchanger to the water heater via the second water pipe based on a pump control signal from the controller,
wherein
the first water pipe is connected to a tank drain valve on the water heater,
the second water pipe is connected to a pressure relief valve on the water heater, and
the controller is configured to
identify a lower temperature set point for the water in the water heater at which one or more heating elements in the water heater are set to heat the water,
determine when the current water temperature is below a threshold temperature but above the lower temperature set point, instruct the water pump to pump water to the refrigerant-water heat exchanger when the current water temperature is below the threshold temperature but above the lower temperature set point, and instruct the refrigerant source to provide refrigerant to the refrigerant-water heat exchanger when the current water temperature is below the threshold temperature but above the lower temperature set point, and the threshold temperature is a set temperature differential greater than the lower temperature set point.

2. The water-heating system of claim 1, wherein the temperature sensor is attached to the water heater.

3. The water-heating system of claim 1, further comprising:

a current sensor configured to measure an electric current value of an electric current provided to one or more heating elements in the water heater and provide the electric current value to the controller, and the controller is further configured to identify the lower temperature set point to be a first water temperature in the water heater when the electric current value first exceeds a current threshold, identify an upper temperature set point to be a second water temperature in the water heater when the electric current value stops exceeding the current threshold, instruct the water pump to stop pumping water to the refrigerant-water heat exchanger when the water in the water heater rises above the upper temperature set point, and instruct the refrigerant source to stop providing refrigerant to the refrigerant-water heat exchanger when the water in the water heater rises above the upper temperature set point.

4. The water-heating system of claim 3, wherein the one or more heating elements in the water heater are determined to be activated when the electric current value exceeds a current threshold and are determined to be deactivated when the electric current is below the current threshold.

5. The water-heating system of claim 1, wherein the refrigerant source is an air-conditioner.

6. The water-heating system of claim 1, wherein the controller is a microprocessor.

7. A method of heating water contained in a water heater, the method including:

determining a lower temperature set point that represents a temperature of water in the water heater below which one or more heating elements in the water heater activate to heat the water in the water heater; and performing a first control, the first control including measuring a water temperature in the water heater in the first control after determining the lower temperature set point;

determining that the water temperature measured in the first control is below a threshold water temperature but above the lower temperature set point;

sending heated refrigerant from a refrigerant source to a refrigerant-water heat exchanger after determining that the water temperature measured in the first control is below the threshold water temperature but above the lower temperature set point;

sending water from the water heater to the refrigerant-water heat exchanger after it is determined that the water temperature measured in the first control is below the threshold water temperature but above the lower temperature set point; and exchanging heat between the refrigerant and the water from the water heater after sending heated refrigerant from the refrigerant source to the refrigerant-water heat exchanger and sending water from the water heater to the refrigerant-water heat exchanger, wherein the threshold water temperature is a set temperature differential greater than the lower temperature set point.

8. The method of claim 7, wherein the set temperature differential varies based on a rate of change in water in the water heater.

9. The method of claim 7, wherein the first control further comprises:

repeatedly measuring the water temperature measured in the first control and determining that the water temperature measured in the first control is above the threshold water temperature prior to determining that the water temperature measured in the first control is below the threshold water temperature but above the lower temperature set point.

10. The method of claim 7, wherein the operation of determining the lower temperature set point includes performing a second control, the second control including:

determining whether one of the one or more heating elements in the water heater has been activated;

measuring a water temperature in the water heater in the second control in response to the one of the one or more heating elements in the water heater being activated; and setting the lower temperature set point to be equal to the water temperature measured in the second control after it is determined that the one of the one or more heating elements in the water heater has been activated.

11. The method of claim 7, wherein the operation of determining the lower temperature set point includes performing a third control, the third control including:

measuring an electric current provided to at least one of the one or more heating elements in the water heater in the third control;

measuring a water temperature in the water heater in the third control in response to measuring the electric current in the third control;

determining that the electric current measured in the third control is above a current threshold; and setting the lower temperature set point to be equal to the water temperature measured in the third control after it is determined that the electric current measured in the third control is above the current threshold.

12. The method of claim 11, wherein the third control further comprises:

repeatedly measuring the electric current, measuring the water temperature measured in the third control, and determining that the electric current measured in the third control is below the current threshold prior to determining that the electric current measured in the third control is above the current threshold.

13. The method of claim 7, further comprising performing a fourth control, the fourth control including:

determining an upper temperature set point that represents a temperature of the water in the water heater above which the one or more heating elements are deactivated;

measuring a water temperature in the water heater in the fourth control after exchanging heat between the refrigerant and the water from the water heater;

determining that the water temperature measured in the fourth control is above the upper temperature set point after remeasuring the water temperature measured in the fourth control;

stopping sending heated refrigerant from the refrigerant source to the refrigerant-water heat exchanger after it is determined that the water temperature measured in the fourth control is above the upper temperature set point; and stopping sending water from the water heater to the refrigerant-water heat exchanger after it is determined that the water temperature measured in the fourth control is above the upper temperature set point.

14. The method of claim 13, wherein the fourth control further comprises:

repeatedly measuring the water temperature measured in the fourth control, and determining that the water temperature measured in the fourth control is below the upper temperature set point prior to determining that the water temperature measured in the fourth control is above the threshold water temperature.

15. The method of claim 13, wherein the operation of determining the upper temperature set point includes:

exchanging heat between the refrigerant and the water from the water heater in the refrigerant-water heat exchanger; and performing a third control, the third control including measuring an electric current provided to at least one of the one or more heating elements in the water heater in the third control after exchanging heat between the refrigerant and the water from the water heater in the refrigerant-water heat exchanger;

measuring a water temperature in the water heater in the third control in response to measuring the electric current in the third control;

determining that the measured electric current measured in the third control is below a current threshold; and setting the upper temperature set point to be equal to the water temperature measured in the third control after it is determined that the electric current measured in the third control is below the current threshold.

16. The method of claim 15, wherein the third control further comprises:

repeatedly measuring the electric current in the third control, measuring the water temperature in the third control, and determining that the electric current measured in the third control is above the current threshold prior to determining that the electric current measured in the third control is below the current threshold.

17. The method of claim 7, further comprising:

determining that heating is available for water in a water heater from the refrigerant source prior to measuring the water temperature in the first control.

18. The method of claim 17, wherein the refrigerant source is an air-conditioner, and the operation of determining that heating is available from the refrigerant source includes determining that the air-conditioner is in a cooling mode.

19. The method of claim 7, further comprising:

comparing a current timer value to a threshold timer value prior to measuring the water temperature in the first control;

determining that the current timer value is greater than or equal to the threshold timer value based on the comparing of the current timer value to the threshold timer value; and redetermining the lower temperature set point when the current timer value is greater than or equal to the threshold timer value prior to measuring the water temperature in the first control.

20. The method of claim 19, wherein the operation of redetermining the lower temperature set point includes performing a fifth control, the fifth control including:

measuring an electric current provided to a heating element associated with the water heater in the fifth control;

measuring a water temperature in the water heater in the fifth control in response to measuring the electric current measured in the fifth control;

determining that the electric current measured in the fifth control is above the current threshold; and setting the lower temperature set point to be equal to the water temperature measured in the fifth control after it is determined that the electric current measured in the fifth control is above the current threshold.

21. The method of claim 20, further comprising:

repeatedly measuring the electric current in the fifth control, measuring the fifth water temperature in the fifth control, and determining that the electric current measured in the fifth control is below the current threshold prior to determining that the measured electric current measured in the fifth control is above the current threshold.

* * * * *